(12) United States Patent
Ito

(10) Patent No.: US 8,477,383 B2
(45) Date of Patent: Jul. 2, 2013

(54) PROCESSING BASED ON COMMAND AND REGISTER

(75) Inventor: Tadayuki Ito, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 433 days.

(21) Appl. No.: 12/771,569

(22) Filed: Apr. 30, 2010

(65) Prior Publication Data

US 2010/0309511 A1 Dec. 9, 2010

(30) Foreign Application Priority Data

Jun. 4, 2009 (JP) .................................. 2009-135354

(51) Int. Cl.
*H04N 1/40* (2006.01)

(52) U.S. Cl.
USPC ........... 358/448; 358/1.16; 358/2.1; 358/401; 358/523; 710/9; 710/22; 710/33; 711/5; 711/109; 711/170

(58) Field of Classification Search
USPC .............. 358/1.13, 1.15, 2.1, 426.01, 426.03, 358/518, 523, 524, 540, 1.16, 401, 426.04, 358/448; 348/240, 244; 710/9, 22, 33; 711/5, 711/109, 170
See application file for complete search history.

(56) References Cited

U.S. PATENT DOCUMENTS

| | | | | |
|---|---|---|---|---|
| 4,733,305 A | * | 3/1988 | Miura et al. .................. | 358/448 |
| 5,511,215 A | | 4/1996 | Terasaka et al. | |
| 5,577,256 A | | 11/1996 | Muramatsu et al. | |
| 6,587,158 B1 | | 7/2003 | Adams et al. | |
| 6,950,559 B2 | | 9/2005 | Kobayashi | |
| 7,155,602 B2 | * | 12/2006 | Poznanovic .................. | 712/32 |
| 7,251,602 B2 | | 7/2007 | Ito et al. | |
| 2009/0207283 A1 | * | 8/2009 | Nakai et al. .................. | 382/244 |

FOREIGN PATENT DOCUMENTS

| | | |
|---|---|---|
| JP | 06-044389 A | 2/1994 |
| JP | 06-139199 A | 5/1994 |
| JP | 7-320066 A | 12/1995 |
| JP | 2000-312327 A | 11/2000 |
| JP | 2002-366507 A | 12/2002 |
| JP | 3733826 B | 10/2005 |
| JP | 2006-139606 A | 6/2006 |
| JP | 2009-058994 A | 3/2009 |

OTHER PUBLICATIONS

English Machine Translation of JP H07-320066-A (Kaneko, Published Dec. 8, 1995).*
English Machine Translation of JP 2000-312327 A (ueno et al, Published Nov. 7, 2000).*
Japanese Office Action issued on Jan. 25, 2013, corresponding to Japanese Application No. 2009-135354.

* cited by examiner

*Primary Examiner* — Benny Q Tieu
*Assistant Examiner* — Juan M Guillermety
(74) *Attorney, Agent, or Firm* — Fitzpatrick, Cella, Harper & Scinto

(57) ABSTRACT

An image processing apparatus that applies image processing to image data read from a memory, the image processing apparatus including: an image processing input circuit that acquires a command list from the memory by direct memory access and that outputs a command based on the command list; and an image processing circuit that is connected to the image processing input circuit and that sets a register or executes processing of the image data in accordance with the command outputted from the image processing input circuit. The image processing input circuit uses an address instructed by a register control command to acquire image data from a memory by direct memory access if a data acquisition command for instructing data acquisition is acquired from the command list, generates a data processing command including the acquired image data, and outputs the command to the image processing circuit.

9 Claims, 25 Drawing Sheets

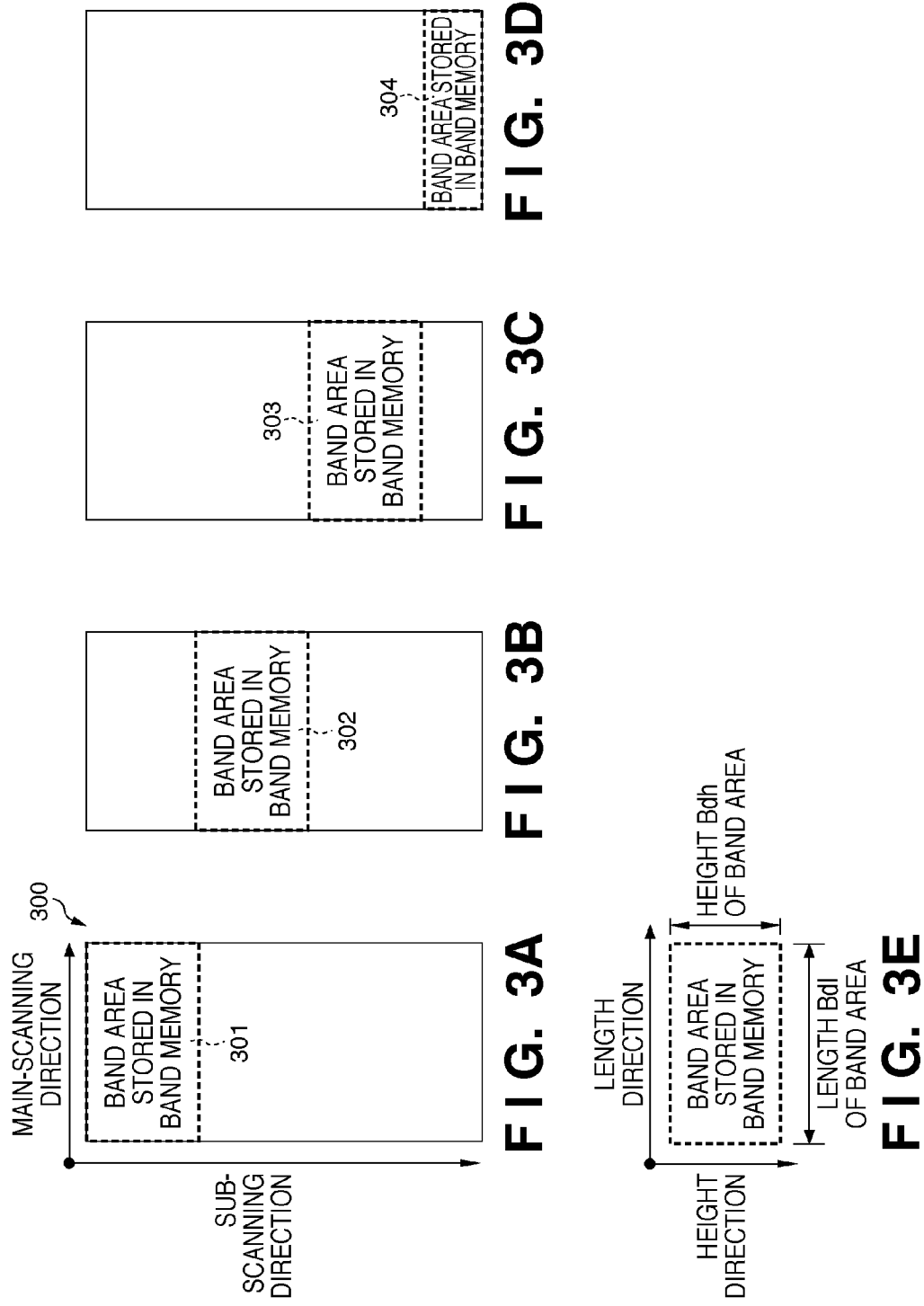

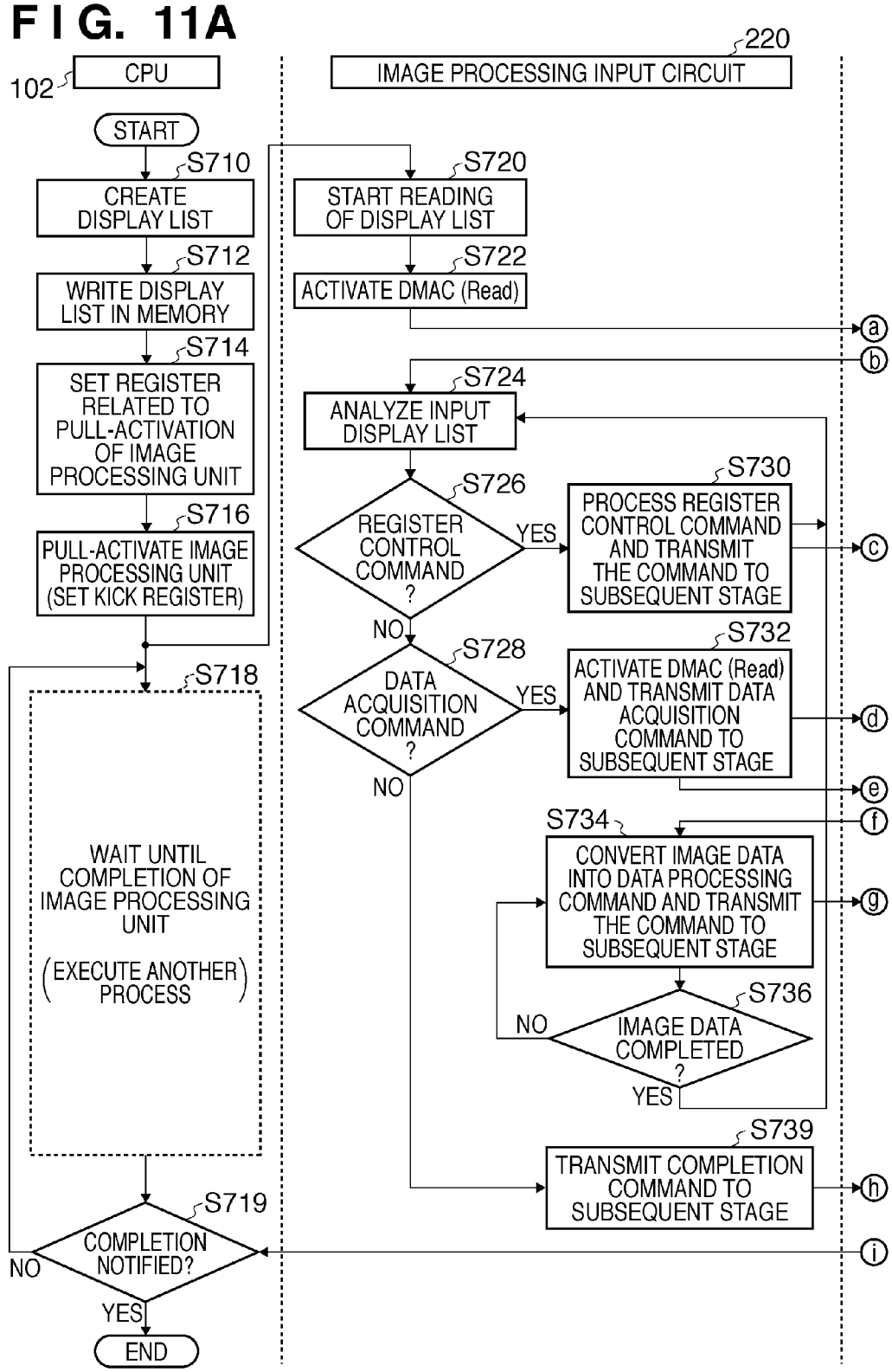

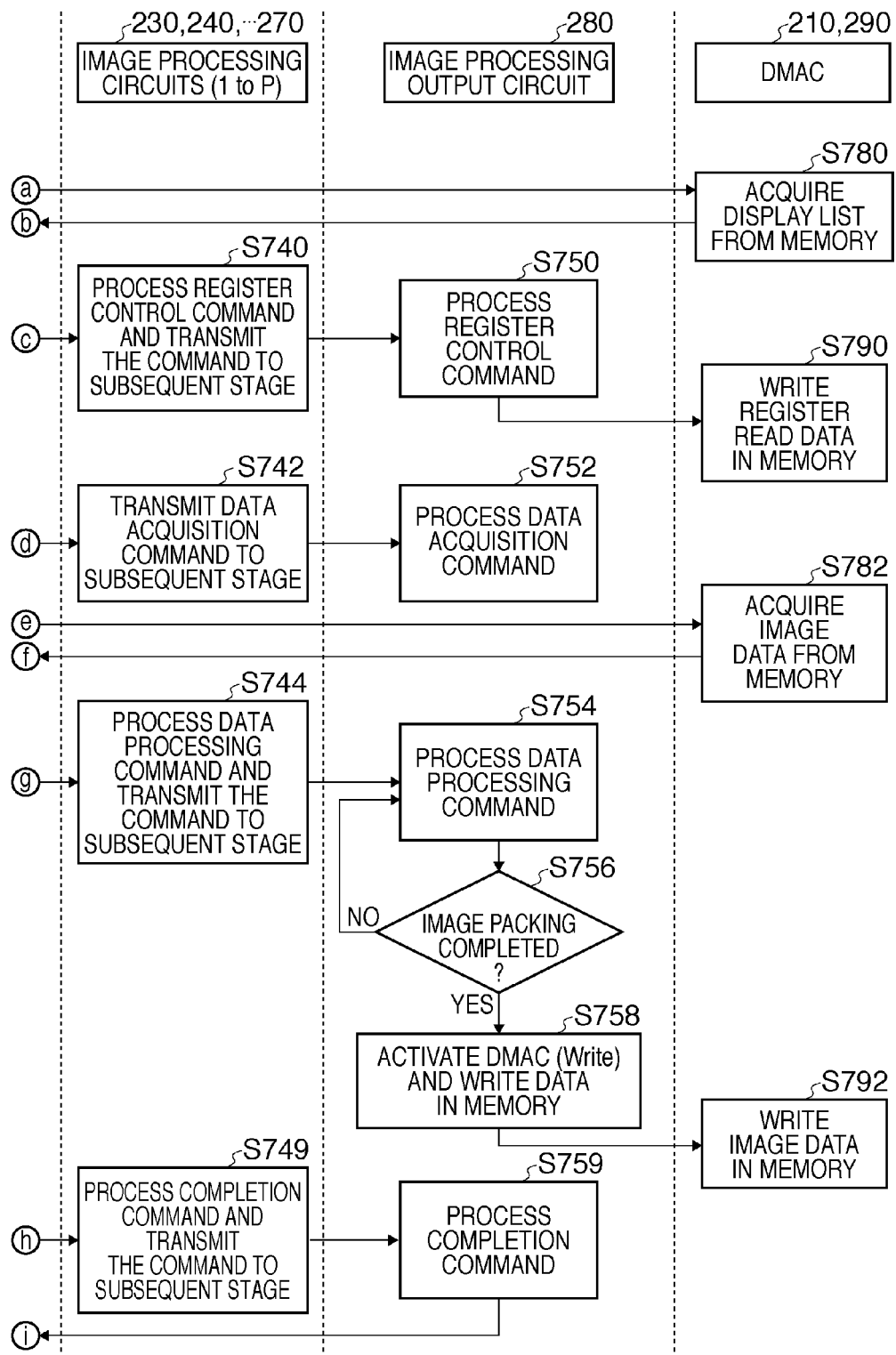

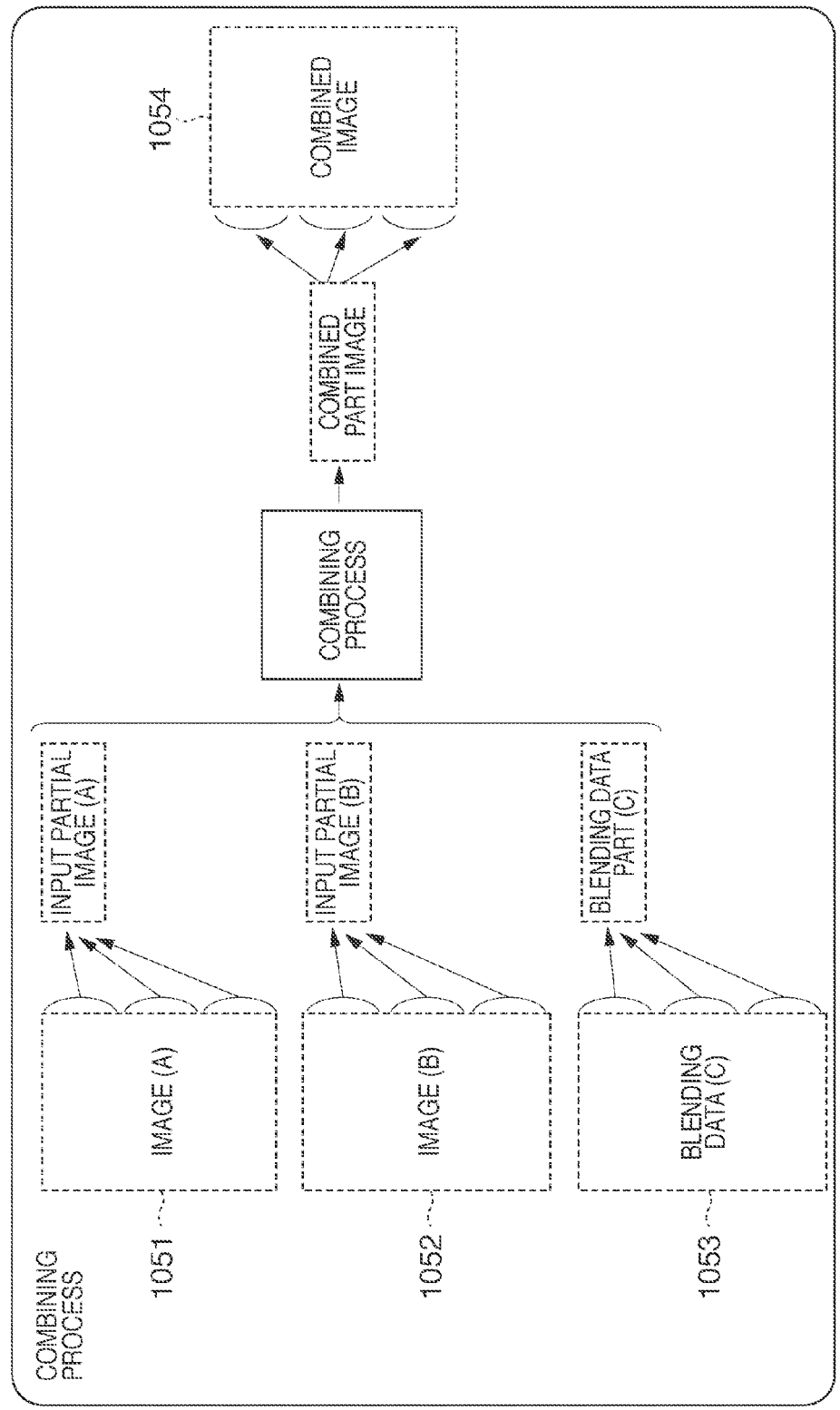

PROCESSING BASED ON COMMAND AND REGISTER

BACKGROUND OF THE INVENTION

1. Field of the Invention

The present invention relates to an image processing method and an image processing apparatus. Particularly, the present invention relates to an image processing method and an image processing apparatus suitable for use in dividing a plurality of image data, correction data, etc. of a main memory to handle the data in image processing to execute image processing and correction processing by sequential reading of necessary data.

2. Description of the Related Art

In general, local (near) image processing, such as a spatial filtering process, is executed to form and output an image. The local image processing is image processing for performing some kind of calculation using pixels included in a spatial filter area including pixels to be processed (hereinafter, abbreviated as processing pixels).

For example, a spatial filtering process, such as edge enhancement and shading, is applied to digital image data 300 of FIG. 3A. U.S. Pat. No. 6,587,158 (hereinafter, Document 1), Japanese Patent Laid-Open No. 2000-312327 (hereinafter, Document 2), Japanese Patent No. 3733826 (hereinafter, Document 3), and Japanese Patent Laid-Open No. 2006-139606 (hereinafter, Document 4) provide a technique for dividing digital image data into areas to apply local image processing to each area. In the technique, as shown in FIGS. 3A to 3D, the entire data of a digital image is divided into band shapes (strip shapes), and various image processes are sequentially applied to the areas.

The divided elongated areas will be called band areas, and a storage area, in which the band areas are developed, will be called a band memory. The band memory is reserved in, for example, a main memory as a storage area. In the band processing, local image processing is executed with no space between the band areas. Therefore, parts of the band areas overlap each other at boundaries with adjacent areas. In Document 4, pixels are scanned one by one in the direction of the height of the band areas to define, by the sizes of the height of the band areas, the capacity of the delay memory holding processing pixels required in the local image processing, and memory saving of the delay memory is realized.

Meanwhile, there are many image processes that cannot be handled by considering only the local image processing, as in the technique described in Documents 1 to 4.

First, there is a correction process to correct individual differences in read elements of a sensor device in an image read by an image reading apparatus such as a scanner. In the correction process, a read image to be corrected is corrected pixel data by pixel data (pixel value) based on read minimum value data and read maximum value data.

Furthermore, there is image processing for combining a plurality of rendering images in accordance with blending data ($\alpha$ value). In this type of image processing, for example, two rendering images to be combined are combined with a combination ratio (blending data) set in each pixel.

Furthermore, for example, a plurality of field images continuous in the time axis direction are referenced to execute an adaptive spatial filtering process as in interlace/progressive conversion (hereinafter, abbreviated as I/P conversion) of moving images. In image processing of referencing a plurality of field images, such as in the I/P conversion, high-quality image processing can be executed if an adaptive process is executed using a larger amount of field images. Therefore, it is important to flexibly switch the image processing method in accordance with the resolution and the number of reference fields.

What is common in the above image processing is that it is not sufficient just to execute image processing by considering only one piece of image data in which pixel data is two-dimensionally arranged. For example, there are the following cases of the image data, the correction data, and the blending data necessary in the image processing.

The number of times of reading from an external memory varies depending on the sensor shape.

The number of rendering images read from an external memory varies depending on the number designated by the user.

The number of field images read from an external memory vary depending on the input resolution of broadcast wave.

As described, there are a variety of data necessary in image processing, and the data are usually stored in an external memory. Therefore, a variety of data need to be read from the external memory in accordance with the type of image processing, and the data need to be transferred to an image processing circuit.

In the field of image processing apparatus, a CPU usually sets a read address to a direct memory access controller (hereinafter, DMAC) and activates the DMAC. The activated DMAC acquires data necessary for image processing from the external memory through a memory controller in accordance with the read address and transfers the acquired data to the image processing circuit. The image processing circuit executes the image processing based on the input data.

The data is stored in another area of the external memory, because the types of data are different such as in the correction process, or because the data is inputted from the external device at different time depending on the broadcast wave such as in the I/P conversion. To further divide the data stored in the other area into the band areas to sequentially execute the image processing, the data in the other area needs to be partially read from the external memory for an amount of areas equivalent to the band areas, and the data needs to be transferred to the image processing circuit. To realize such data reading, a multi-channel DMAC as in Japanese Patent Laid-Open No. 7-320066 (hereinafter, Document 5) and Japanese Patent Laid-Open No. 2002-366507 (hereinafter, Document 6) may be used.

However, even if the multi-channel DMAC is used, in the sequential image processing of the band areas, a CPU that controls the DMAC needs to perform the following series of controls every time an image processing completion interrupt from the image processing circuit is detected.

(1) Set top addresses and transfer sizes of various data necessary in the image processing of the next band areas to the DMAC.

(2) Set the register of the image processing circuit.

(3) Activate the DMAC.

(4) Transfer image data from the external memory to the image processing circuit by the DMAC. Therefore, the CPU needs to repeat the control of (1) to (4) for the number of times of band processing, for each type of data.

To scan one pixel in the height direction of the band areas as in Documents 2 to 4, an image processing input circuit described below needs to perform HV conversion (scan conversion from the horizontal direction to the vertical direction). For the HV conversion, the CPU activates the DMAC for a significantly large number of times for low-capacity transfer blocks described below, and the number of controls by the CPU increases.

Meanwhile, a universal CPU is designed to consume processing time of one cycle for any calculation and also consume processing time of one cycle for writing and reading of parameters, intermediate calculation data, etc. that are necessary in image processing to and from the register. Therefore, the processing capacity per operating frequency of an image processing circuit designed to be able to execute a calculation process in parallel in a pipeline configuration is significantly higher.

In recent years, it is desired to handle various requests of image processing within limited cost. More specifically, an apparatus and a method for flexibly realizing the various image processes while keeping the memory bandwidth and the circuit size constant are desired.

In the conventional technique of Documents 1 to 4, no examination is performed from a viewpoint of flexibly acquiring various data from an external memory in accordance with the quantity of a plurality of correction data for one piece of image data, a plurality of image data, or a plurality of consecutive field images. Examples of the quantity of data include the number of correction data, the number of rendering images, and the number of reference fields.

In Documents 5 and 6, how to associate the CPU, the DMAC, and the image processing unit is not examined from a viewpoint of flexible acquisition, for each band area, of the various data necessary in the various image processes from the external memory. Furthermore, no examination is performed from a viewpoint of improving the processing capacity per operating frequency (consumed power) by the CPU dedicated to image processing temporarily using calculation resources of the image processing unit.

SUMMARY OF THE INVENTION

According to an embodiment of the present invention, an image processing apparatus and a control method are provided, in which an image processing unit can flexibly read various data from an external memory for each band area to autonomously execute image processing, and the process load for controlling a DMAC of a CPU is reduced.

According to one aspect of the present invention, there is provided an image processing apparatus comprising:

an input unit configured to acquire a command list from a memory and to output a command based on the command list; and a processing unit configured to execute a process based on the command outputted from the input unit, wherein the input unit is configured to output a register control command indicating an instruction to a register to the processing unit if the register control command is acquired from the command list, and to acquire image data from the memory based on the register control command and generate a data processing command including the acquired image data to output the data processing command to the processing unit if a data acquisition command for instructing data acquisition is acquired from the command list.

Further features of the present invention will become apparent from the following description of exemplary embodiments with reference to the attached drawings.

BRIEF DESCRIPTION OF THE DRAWINGS

FIGS. 3A to 3E are diagrams explaining an example of an operation of band processing.

FIGS. 11A and 11B are flow diagrams explaining an example of image processing by the image processing unit.

DESCRIPTION OF THE EMBODIMENTS

Preferred embodiments of the present invention will now be described with reference to the attached drawings.

Figure 1:
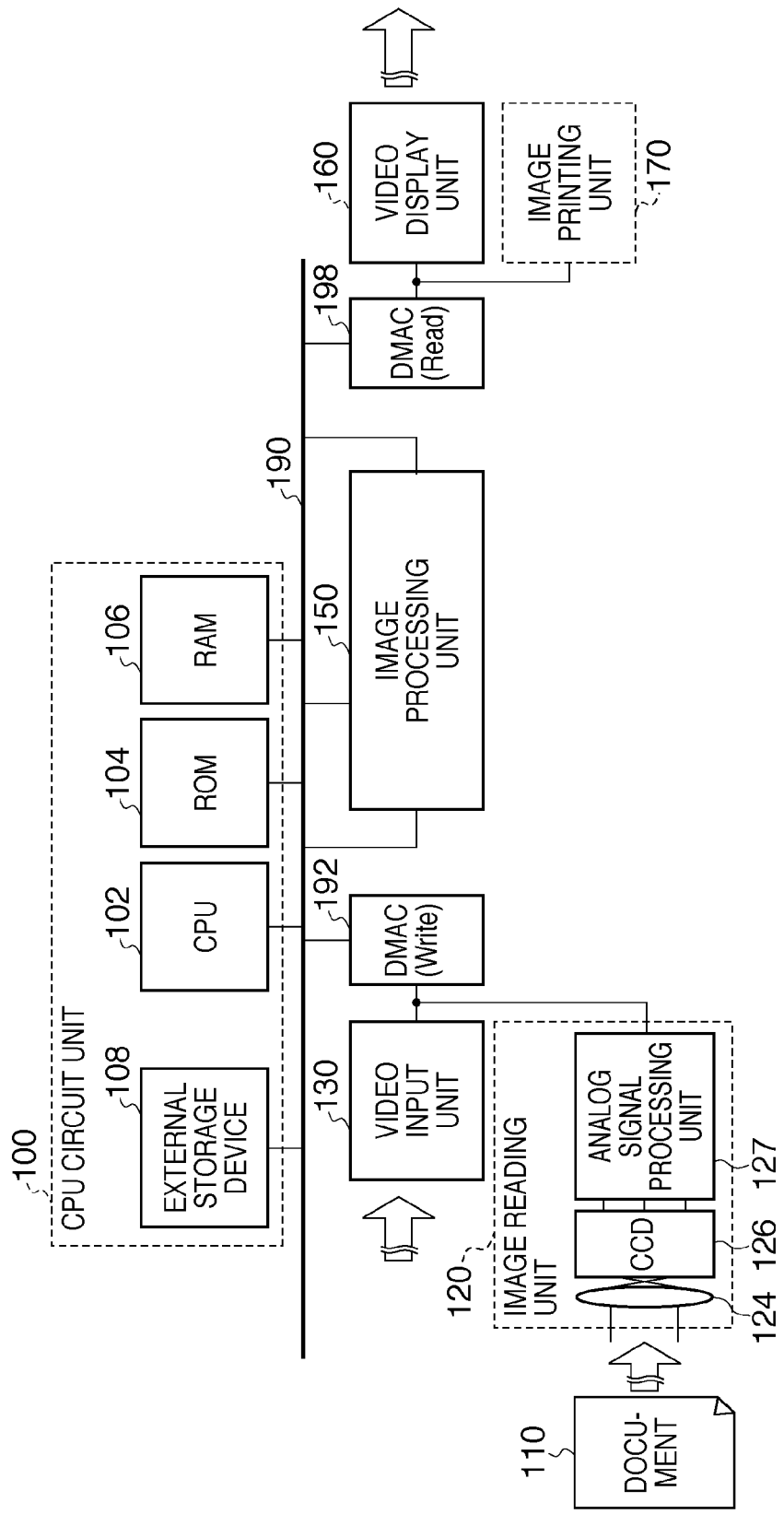
FIG. 1 is a block diagram showing an example of an entire configuration of an image processing apparatus.

FIG. 1 is a block diagram showing an example of an entire configuration of an image processing apparatus according to an embodiment. In FIG. 1, an image reading unit 120 comprises a lens 124, a CCD sensor 126, an analog signal processing unit 127, etc. In the image reading unit 120, the CCD sensor 126 converts image information of a document 110 formed on the CCD sensor 126 through the lens 124 into R (Red), G (Green), and B (Blue) analog electric signals. The image information converted into the analog electric signals is inputted to the analog signal processing unit 127. A correction, etc. is applied to each of R, G, and B colors, and then an analog/digital conversion (A/D conversion) is applied. In this way, a digitalized full-color image (will be referred to as digital image signal) is generated. A direct memory access controller (DMAC) 192, for which the CPU 102 has set operations in advance, stores the generated digital image signal in a RAM 106 of a CPU circuit unit 100 through a shared bus 190 as digital image data.

The CPU 102 sets a predetermined value to an activation register of an image processing unit 150 to activate the image processing unit 150. The image processing unit 150 acquires a command list from a ROM 104, the RAM 106 (main memory), or an external storage device 108. In the present embodiment, a display list described below is used as the command list. The image processing unit 150 then sets the register of an image processing circuit, etc. inside the image processing unit 150 in accordance with the acquired display list and reads digital image data from the RAM 106 (main memory) or the external storage device 108. Correction of individual differences between read elements of a sensor device, such as a scanner, and color correction, such as input gamma correction, are applied to the inputted digital image signal to normalize the read image to create a certain level of digital image data. The image processing unit 150 stores the processed digital image signal in the RAM 106 (main memory) in accordance with the register setting value in the display list.

Furthermore, for example, the image processing unit 150 applies image processing for printing, such as an input color correction process, a spatial filtering process, a color space conversion, a density correction process, and a halftone process, to the inputted digital image signal to create printable digital image data. In the same way as described above, the image processing unit 150 stores the created digital image data in the RAM 106. Lastly, the CPU 102 uses a DMAC 198 to read the image-processed digital image data stored in the RAM 106 and outputs the data to an image printing unit 170 (printer). The image printing unit 170 comprises, for example, a print output unit (not shown), such as a raster plotter using an inkjet head, a thermal head, etc., and records the image to paper based on the inputted digital image signal.

The CPU circuit unit 100 comprises the CPU 102 for calculation control, the ROM 104 for storing fixed data and programs, the RAM 106 used for temporary storage of data and loading of programs, the external storage device 108, etc. The CPU circuit unit 100 controls the image reading unit 120, the image processing unit 150, the image printing unit 170, etc. and comprehensively controls the sequence of the image processing apparatus of the present embodiment. The external storage device 108 is a storage medium, such as a disk for storing parameters, programs, and correction data used by the image processing apparatus of the present embodiment. The data, the programs, etc. of the RAM 106 may be configured to be loaded from the external storage device 108.

First, a case of using band processing based on the band areas to apply a correction process of correcting individual differences between read elements of a sensor device to an image read by the image reading unit 120 of FIG. 1 will be described. In the band processing, a new coordinate system (band area coordinate system) of length direction and height direction is defined as shown in FIG. 3E as a coordinate system (main-scanning direction—sub-scanning direction) of digital image data, and the band areas are expressed by length×height. The length of the band areas is a value of one of the width in the main-scanning direction and the height in the sub-scanning direction of the digital image data, and the height of the band is an arbitrary value. For example, the length of the band areas when a plurality of band areas are reserved in the main-scanning direction is the height in the sub-scanning direction of the digital image data.

In the band processing, a first band area 301 shown in FIG. 3A is developed in the band memory on the main memory to execute image processing. A second band area 302 shown in FIG. 3B is developed by overwriting the band memory including the developed first band area 301 to execute image processing. A third band area 303 shown in FIG. 3C is developed by overwriting the band memory including the developed second band area 302 to execute image processing. Lastly, a fourth band area 304 shown in FIG. 3D is developed by overwriting the band memory including the developed third band area 303 to execute image processing. As is clear from FIGS. 3A to 3D, although the lengths of the band areas 301 to 304 are the same, the heights do not have to be the same. The height of the band memories as the storage areas reserved in the main memory is determined by the band area with the largest size in the height direction (the first to third band areas 301 to 303 in the case of FIGS. 3A to 3D).

Figure 19A:
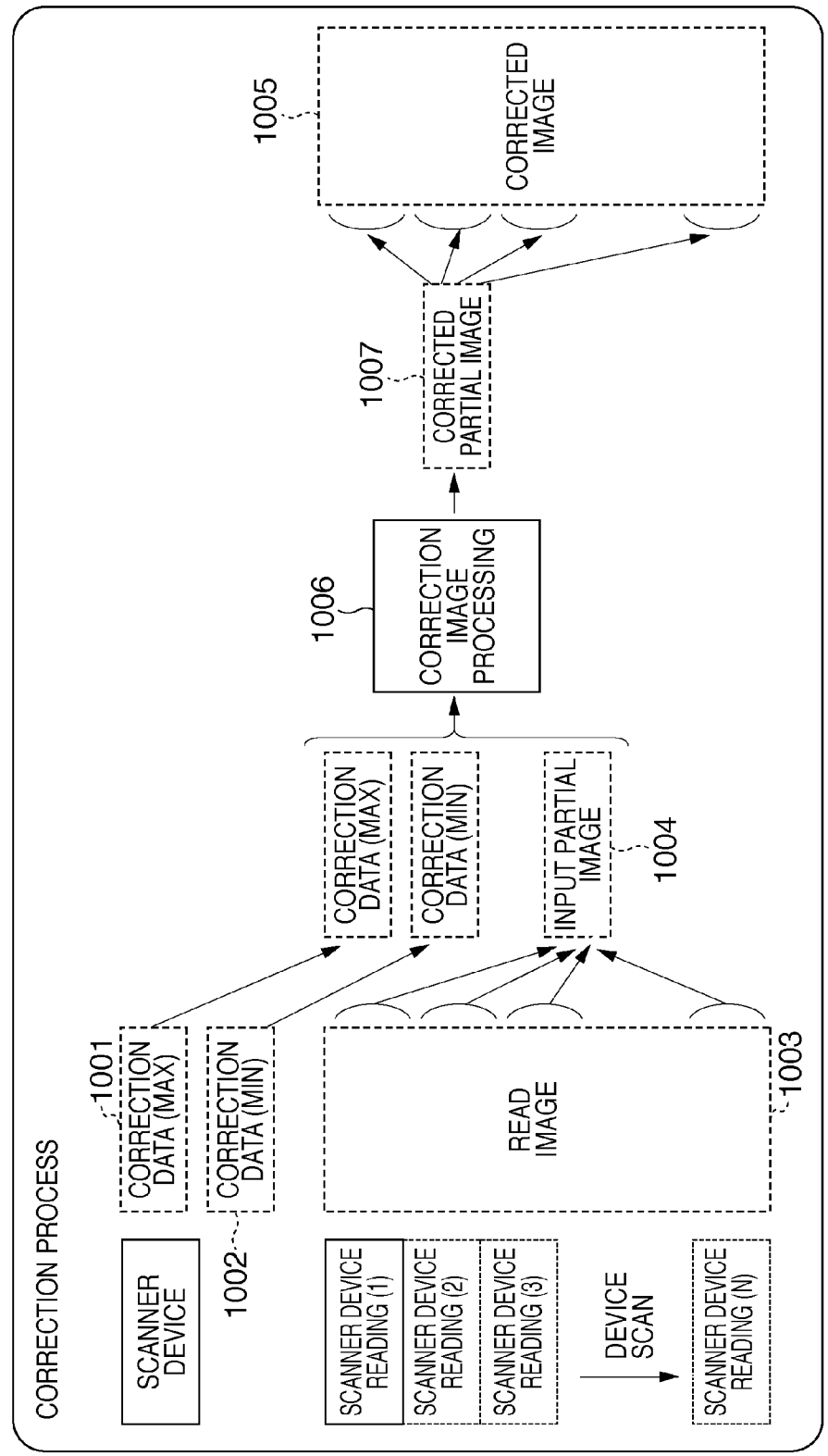
FIGS. 19A and 19C are diagrams explaining an example of image processing.

FIG. 19A is a diagram explaining a correction process for correcting individual differences between read elements of a sensor device in an image read by an image reading apparatus such as a scanner. Information necessary in the correction process is read minimum value data (correction data 1002) and read maximum value data (correction data 1001) of each read element of the sensor device. In correction image process 1006, a read image 1003 to be corrected is corrected in each pixel datum (pixel value) by calculation using, for example, [Expression 1] based on the information to obtain a corrected partial image 1007.

$$X=(P-\text{MIN})/(\text{MAX}-\text{MIN})\times 1023 \qquad \text{[Expression 1]}$$

In this case, P denotes a read pixel value, MIN denotes a read minimum value, MAX denotes a read maximum value, and X denotes a corrected pixel value (X is a 10-bit digital signal).

The process is repeated for the read image 1003 to obtain a corrected image 1005. More specifically, data necessary for the correction process includes three different types of information, the correction data 1001 and 1002 different in each pixel and pixel data of the read image (inputted partial image 1004). If the sensor device of the scanner is a line sensor in which read elements of pixels are combined into a line, the sensor moves in the sub-scanning direction to read a two-dimensional image. In such a reading method, the minimum value data and the maximum value data different in each pixel align in the main-scanning direction, and in the sub-scanning direction, the same minimum value data and maximum value data align in the case of the pixels with the same main-scanning position.

In the image processing, the read minimum value data and the read maximum value data of each read element of the sensor device are necessary, and the various data are temporarily stored in the RAM 106. A method of storing the image data in the RAM 106 will be described with reference to FIG. 4.

Figure 4:
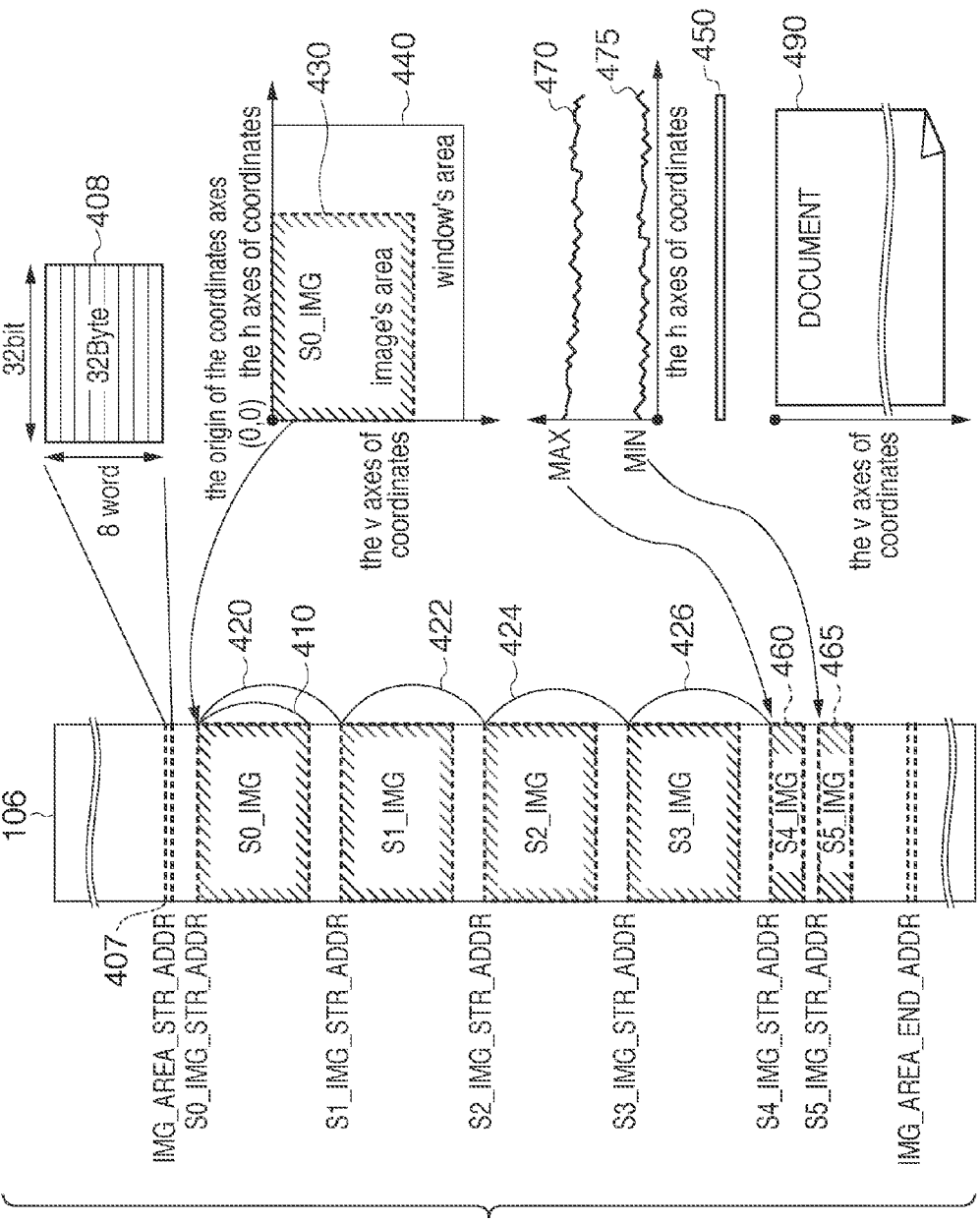
FIG. 4 is a diagram explaining an example of storing data necessary for image processing in a RAM.

From IMG_AREA_STR_ADDR to IMG_AREA_END_ADDR in FIG. 4 are areas storing various data necessary in the image processing. The illustrated example shows a state in which six types of data, S0_IMG to S5_IMG, are stored in the areas. The minimum unit of the capacity of the stored data is 32 bits×8 words, or 32 bytes, as shown by reference numeral 408, so that the data can be accessed without degrading the performance of the DRAM. Obviously, the storage capacity of the image data from S0_IMG to S5_IMG is an integral multiple of 32 bytes. For example, in the case of two-dimensional image data, an area equivalent to a window's area 440 as the maximum image area is shown in an area 420 (422, 424, and 426) on the memory. An area of S0_IMG (image's area) 430 that fits into the area 420 is stored in an area 410 on the memory. When a line sensor device 450 of the scanner moves in the sub-scanning direction (v) relative to a document 490 to read the document, correction data (MAX) 470 and correction data (MIN) 475 are distributed in the main-scanning direction (h) of the line sensor device 450. In the example of FIG. 4, the correction data (MAX) 470 and the correction data (MIN) 475 are stored in S4_IMG 460 and S5_IMG 465 on the RAM 106, respectively.

Figure 6:
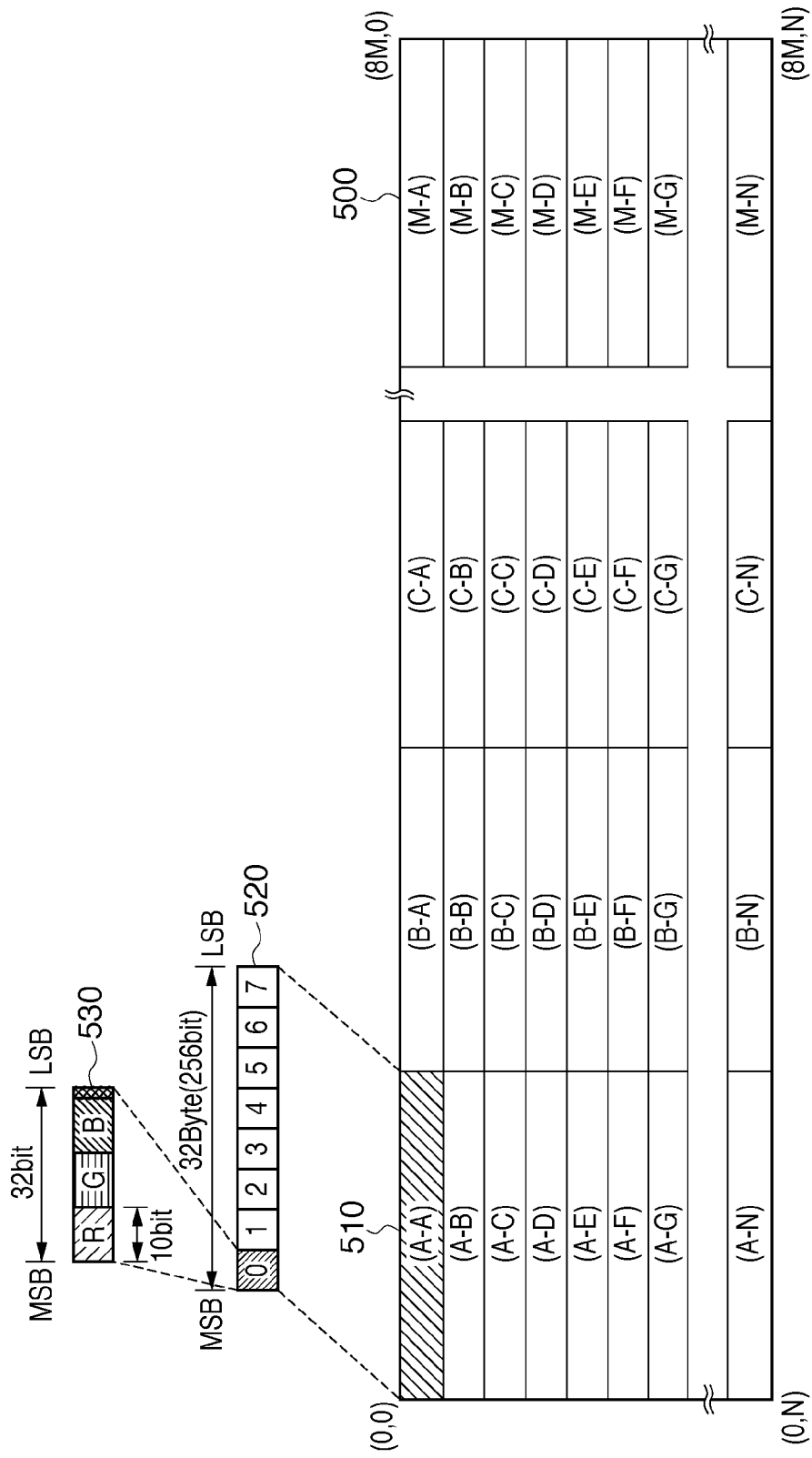
FIG. 6 is a diagram explaining an example of storing pixel values of image data.

A band-by-band data configuration of image data will be described in detail with reference to FIG. 6. Reference numeral 500 denotes digital image data of the area of S0_IMG (image's area) 430. An area 510 is 32-byte data as described above, and data of eight pixels shown by reference 520 is packed in the area 510. In one pixel datum, 10-bit R (Red), G (Green), and B (Blue) data are packed as shown by reference numeral 530. In the illustrated example, the remaining two bits are reserved to simplify the data access by the DRAM and are considered as invalid data and not used in the process. A range with a thick frame 500 of FIG. 6 denotes an 8M×N sized image. The correction data of the scanner/sensor device stored in S4_IMG 460 and S5_IMG 465 described above is data in a range of coordinates (0, 0) to (8M, 0), because it is a line sensor of one line.

Figure 5:
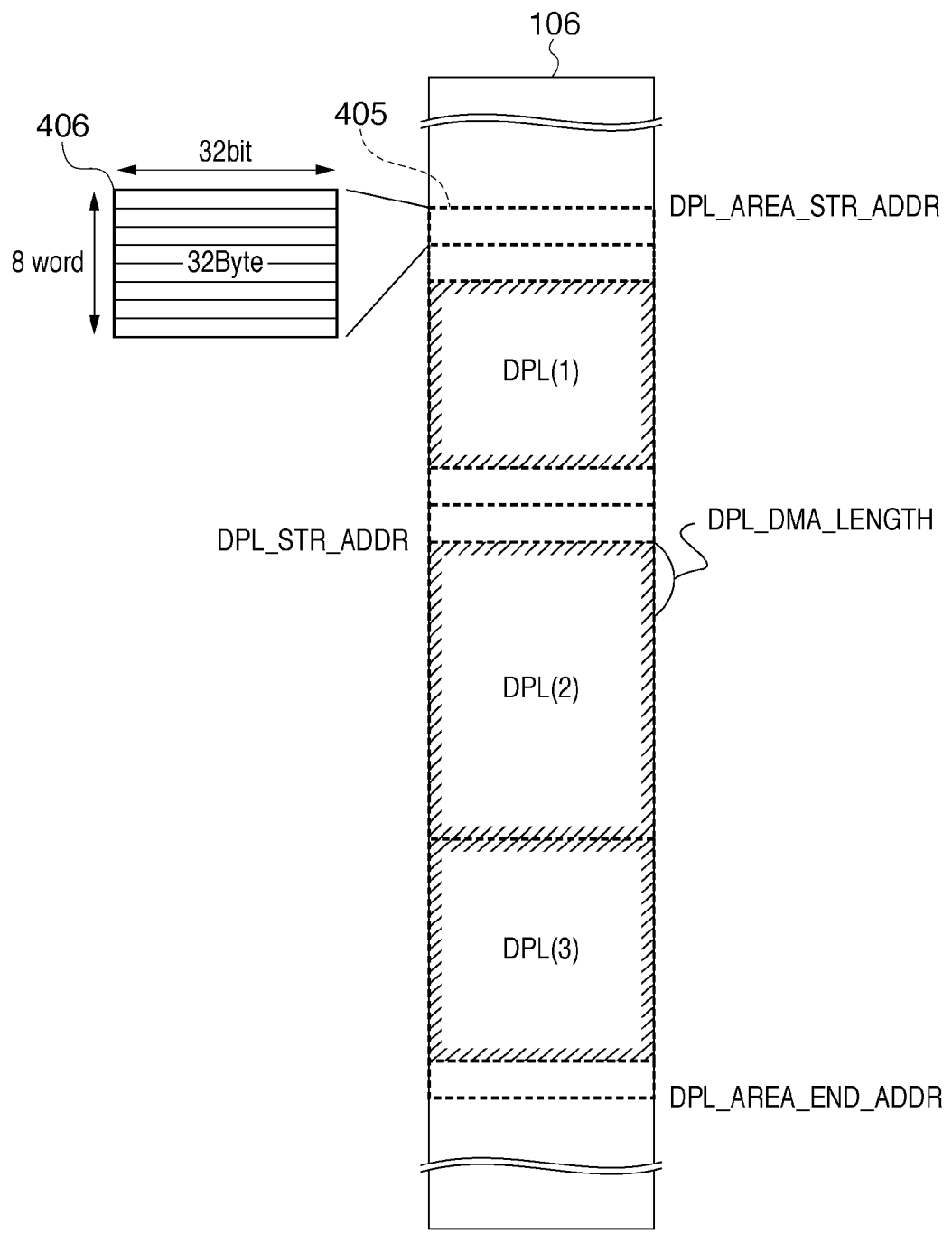
FIG. 5 is a diagram explaining an example of storing a display list in the RAM.

A method of storing the display list in the RAM 106 will now be described with reference to FIG. 5. From DPL_AREA_STR_ADDR to DPL_AREA_END_ADDR in FIG. 5 denote areas for storing various drawing commands necessary in image processing. The illustrated example shows a state in which three types of display lists, DPL (1) to DPL (3), are stored in the areas. The minimum unit of the capacity of the stored data is 32 bits×8 words, or 32 bytes, as shown by reference numeral 406, so that the data can be accessed without degrading the performance of the DRAM. Obviously, the storage capacity of the display list from DPL (1) to DPL (3) is an integral multiple of 32 bytes. The CPU 102 selects a display list to be used in a selected application, user operation, etc. from the DPL (1) to DPL (3) to execute different image processes.

Figure 2A:
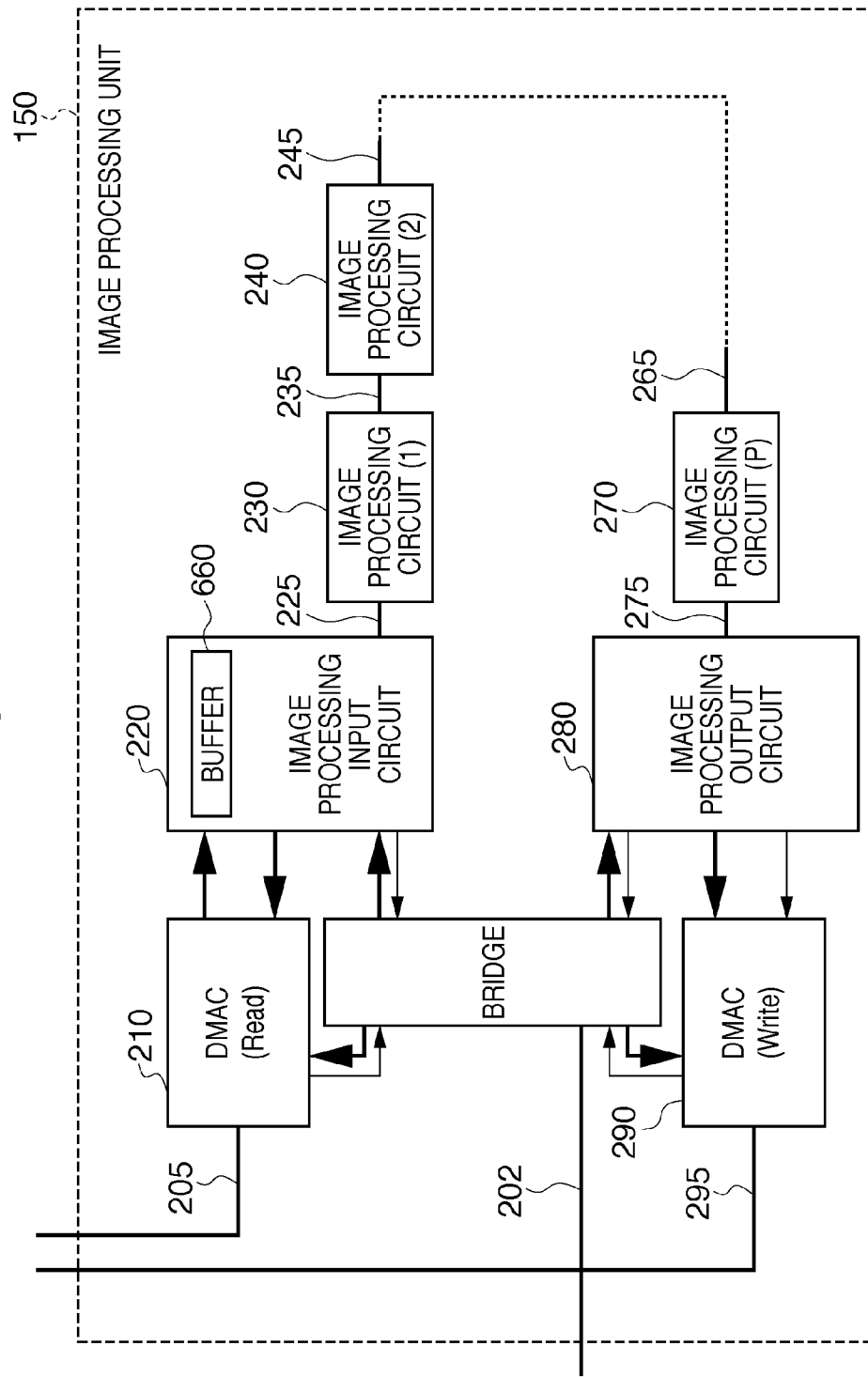
FIGS. 2A and 2B are block diagrams showing examples of circuit configurations of an image processing unit.
Figure 7:
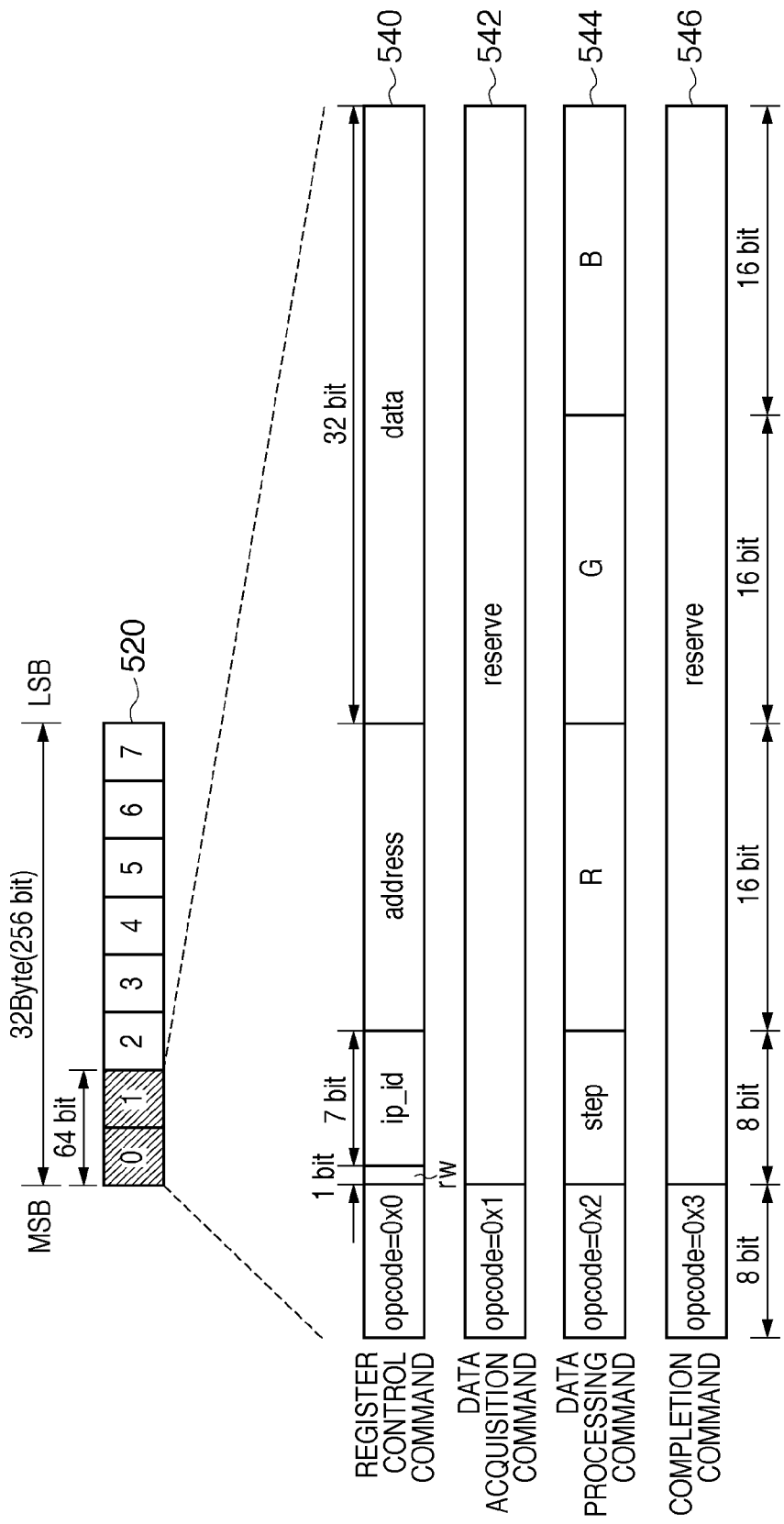
FIG. 7 is a diagram explaining an example of data configuration of commands.

An example of data configuration of commands included in the display list stored in the RAM 106 as the main memory will be described in detail with reference to FIG. 7. In the present embodiment, the commands constituting the display list are 64 bit-length commands, and four commands are stored in the 32-byte data 520. There are at least three types of commands constituting the display list, such as a register control command 540, a data acquisition command 542, and a completion command 546. The data acquisition command 542 is generated by an image processing input circuit 220 and is a command outputted to the image processing circuit (details will be described later). Each command is identified by an operation code (opcode) of upper 8 bits, and lower 56 bits are used in different ways depending on the command. The image processing unit 150 described in FIG. 1 operates the commands. Hereinafter, operations of the commands will be described with reference to FIG. 2A as an example of configuration of the image processing unit 150.

The commands constituting the display list are operated by various image processing circuits of the image processing unit 150 (the image processing input circuit 220, an image processing circuit (1) 230, image processing circuits (2) 240 to (P) 270, and an image processing output circuit 280). The image processing circuit (1) 230 and the image processing circuits (2) 240 to (P) 270 are connected in series by internal buses. In the order of input, the commands are outputted to the image processing input circuit 220, the image processing circuit (1) 230, the image processing circuits (2) 240 to (P) 270, and the image processing output circuit 280 through internal buses 225, 235, 245, . . . , 265, and 275. Although the image processing circuits may rewrite internal information of the commands, the commands are not deleted in the middle.

The register control command 540 (FIG. 7) is a command for reading and writing values to and from the registers of various image processing circuits of the image processing unit 150. The command is a register read command when 1-bit information "rw" is "0", and the command is a register write command when "rw" is "1". Seven-bit circuit identification information "ip_id" denotes information for distinguishing and identifying the various image processing circuits. For example, the image processing input circuit 220 is "0", the image processing circuit (1) 230 is "1", the image processing circuit (2) 240 is "2", the image processing circuit (P) 270 is "P", and the image processing output circuit 280 is "30". Furthermore, 16-bit information "address" denotes information indicating addresses of the registers included in the various image processing circuits. For example, a register control command "rw=1, ip_id=1, address=0x0, data=0xF" will be considered. The register control command is ignored in the image processing input circuit 220 because the circuit identification information "ip_id" is different, and the command is inputted to the image processing circuit (1) 230 through the internal bus 225. In the image processing circuit (1) 230, the register write command is valid because the circuit identification information "ip_id" is the same. Therefore, "data=0xF" is written in the register of an "address=0x0" address of the image processing circuit (1) 230. The image processing circuit (1) 230 does not delete the register write command and inputs the register write command to the next image processing circuit (2) 240 through the internal bus 235 without change. The register write command is ignored in the circuits after the image processing circuit (2) 240 because the circuit identification information "ip_id" is different. The register write command is lastly ignored by the image processing output circuit 280 and is deleted by the image processing output circuit 280. In the case of a register read command "rw=0, ip_id=2, address=0x4, data=0x0", the register read command is ignored by the image processing circuits other than the image processing circuit (2) 240 with circuit identification information "ip_id=2", as in the case of the register write command described above. The register read command is valid in the image processing circuit (2) 240 with the same circuit identification information "ip_id". A register value of an address "address=0x4" is read, and the "data" area of the register read command is replaced by the read value. The data is transmitted to a subsequent image processing circuit through the internal bus 245. As opposed to the register write command described above, only "data" is extracted in the image processing output circuit 280, or the register read command is outputted (stored) to a memory area accessible by the CPU 102.

The data acquisition command 542 is a command for controlling operations of the image processing input circuit 220 and the image processing output circuit 280. The image processing input circuit 220 receives the data acquisition command and activates the DMAC (Read) 210 in accordance with a register value set in advance in the register control command to acquire digital image data or correction data from the main memory. The register value set in advance in the DMAC is, for example, a reading start address and the number of times of reading set by the register control command. The image processing input circuit 220 transmits the data acquisition command to the image processing circuit (1) 230, the image processing circuits (2) 240 to (P) 270, and the image processing output circuit 280 through the internal buses. The transmission of the data acquisition command to the downstream allows easy realization of switch control when, for example, operations of the register control and the data processing are switched in a time-division manner. The image processing input circuit 220 uses the DMAC 210 to convert the acquired digital image data or correction data into a format of a data processing command 544. The image processing input circuit 220 transmits the data processing command 544 to the image processing circuit (1) 230, the image processing circuits (2) 240 to (P) 270, and the image processing output circuit 280 through the internal buses.

The image processing output circuit 280 receives the data acquisition command, extracts information from the RGB areas of the following data processing command, performs predetermined packing, and converts the information into 32-byte data. The image processing output circuit 280 activates a DMAC (Write) 290 in accordance with a register value set in advance by the register control command and writes the processed 32-byte digital image data in the RAM 106.

The data processing command 544 is a command for using the image processing circuit (1) 230 and the image processing circuits (2) 240 to (P) 270 to execute image processing. Predetermined register values are set to the image processing circuit (1) 230 and the image processing circuits (2) 240 to (P) 270 by the register write command before the execution of the image processing. The data processing command 544 includes 8-bit data processing identification information "step". Furthermore, data processing identification information "step" for identifying data processing commands to be processed is set to the image processing circuit (1) 230 and the image processing circuits (2) 240 to (P) 270. Each image processing circuit applies image processing only to the data processing command, in which the data processing identification information "step" of the inputted data processing command is the same as the data processing identification information of the image processing circuit. The image processing circuit ignores other data processing commands. The image processing circuits extract image data of 16-bit R, G, and B areas of the data processing command, executes predetermined image processing, stores the process result in the 16-bit R, G, and B areas of the data processing command, and transmits the data to the subsequent image processing circuit through the internal bus. The image processing circuit (1) 230 and the image processing circuits (2) 240 to (P) 270 execute a series of image processes to execute a parallel process in a pipeline manner. The completion command 546 is a command indicating the completion of the display list. The image processing output circuit 280 receives the command and then outputs a completion interrupt to the CPU 102.

Figure 8A:
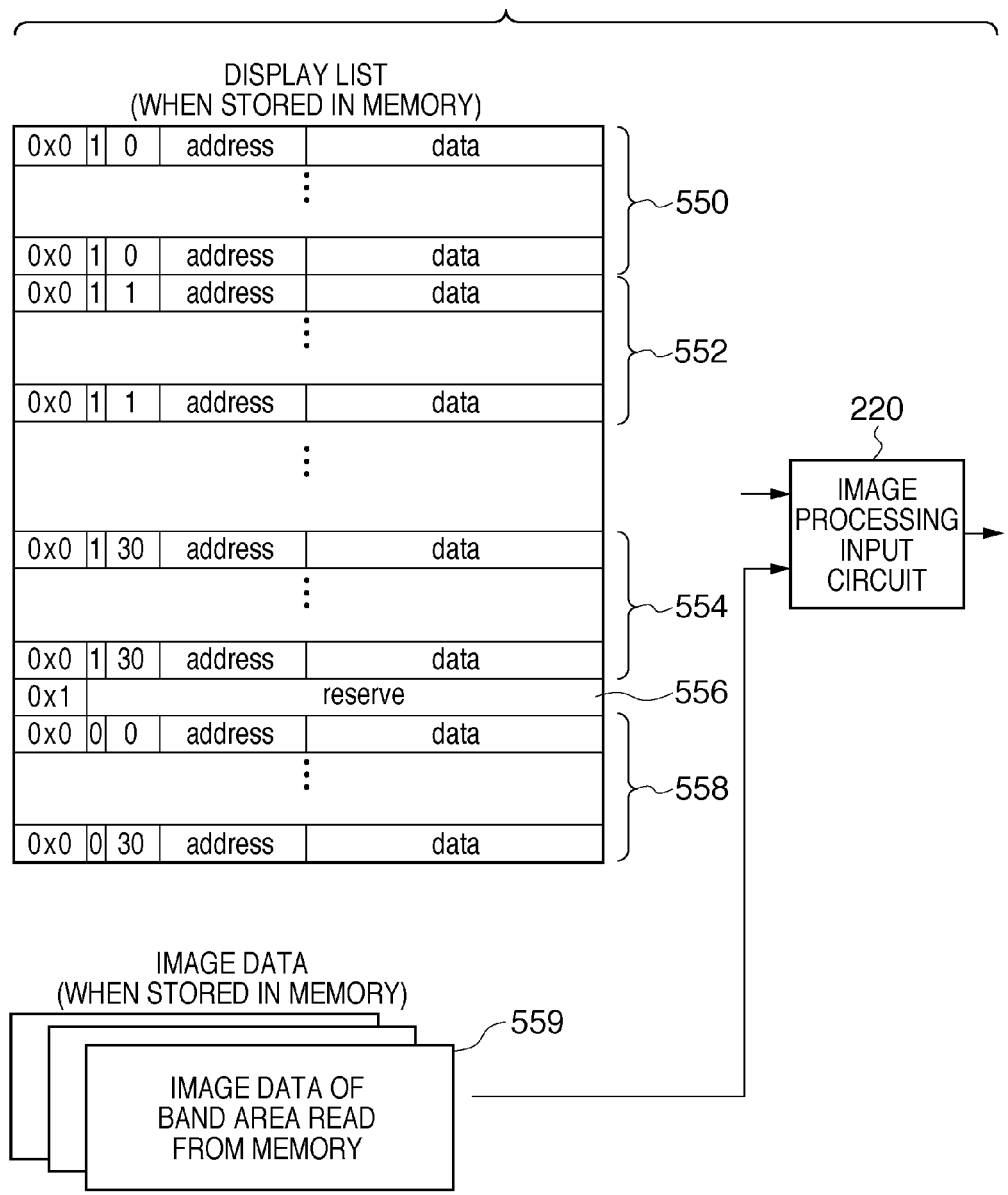
FIG. 8A is a diagram showing an example of the display list and the image data.

The relationship between the operations of the image processing unit 150 and the display list will be described in more detail with reference to FIGS. 2A, 8A, 8B, 8C, 9, 10A, 10B, 11A, and 11B. The read image (digital image data) read by the image reading unit 120 and the correction data are stored in the RAM 106 as described in FIGS. 4 and 6. The CPU 102 first creates a display list as shown in FIG. 8A to apply image processing to the digital image data stored in the RAM 106 (S710). The CPU 102 then writes the created display list in the display list storage area DPL (2) of the RAM 106 described in FIG. 5 (S712). The CPU 102 sets a top address DPL_STR_ADDR of the display list and a consecutive transfer amount DPL_DMA_LENGTH through a dedicated bus 202 for controlling the image processing unit 150 of FIG. 2A (S714). The CPU 102 further writes "0x1" in a register (Kick register) for activating the reading operation of the display list through the dedicated bus 202 (S716). In the present specification, image processing following the display list will be called a PULL-type operation of the image processing unit 150. Subsequently, the CPU 102 is released until the image processing output circuit 280 inputs a completion interrupt of image processing (S718 and S719).

The image processing input circuit 220 sets and activates the DMAC (Read) 210 (S720 and S722) to acquire the display list by direct memory access. More specifically, the image processing input circuit 220 uses the DMAC 210 to read the display list for an amount of continuous DPL_DMA_LENGTH (for example, 1 Kbyte), with an address DPL_STR_ADDR of the RAM 106 as a top address (S780). The image processing input circuit 220 receives an input from the DMAC 210 to temporarily store the read display list in a buffer 660 in the image processing input circuit 220. The image processing input circuit 220 extracts the display list stored in the buffer 660 command by command from the top and analyzes the commands (S724). If the extracted command is a register control command and the circuit identification information "ip_id" is "0", the image processing input circuit 220 processes the register control command and then outputs the command to the subsequent image processing circuit (S726 and S730). If the extracted command is a register control command and the circuit identification information "ip_id" is not "0", the image processing input circuit 220 does not execute any process and outputs the register control command to the subsequent image processing circuit (S726 and S730). Processing (register write and register read) corresponding to the register control command is also executed in the subsequent image processing circuits (1) 230 to (P) 270 based on the circuit identification information "ip_id" (S740). The image processing output circuit 280 executes the register setting process in the same way (S750) and then uses the DMAC (Write) 290 to write only the read register value described in the register read command in the RAM 106 (S790).

Reference numerals 550, 552, and 554 in the example of display list of FIG. 8A denote register write commands (rw=1). More specifically, register write commands for setting the register values of the image processing input circuits 220, the image processing circuits (1) 230 to (P) 270, and the image processing output circuit 280 during image processing align at the top of the display list. If desired register setting of all circuits are completed in the register write commands, a data acquisition command 556 is imported to the image input circuit. If the analyzed command is a data acquisition command, the image processing input circuit 220 transmits the command to the subsequent image processing circuit (1) without change (S728 and S732). At this point, the image processing input circuit 220 saves the address of the buffer 660 storing the data acquisition command in an internal temporary register and temporarily halts the display list analysis. The DMAC (Read) 210 is set and activated in accordance with the set register value (S732), and image data is acquired by direct memory access. More specifically, the DMAC 210 reads the digital image data for an amount of a predetermined number of consecutive repetitions described below from the top address S0_IMG_STR_ADDR of the RAM 106 (S782).

Figure 8B:
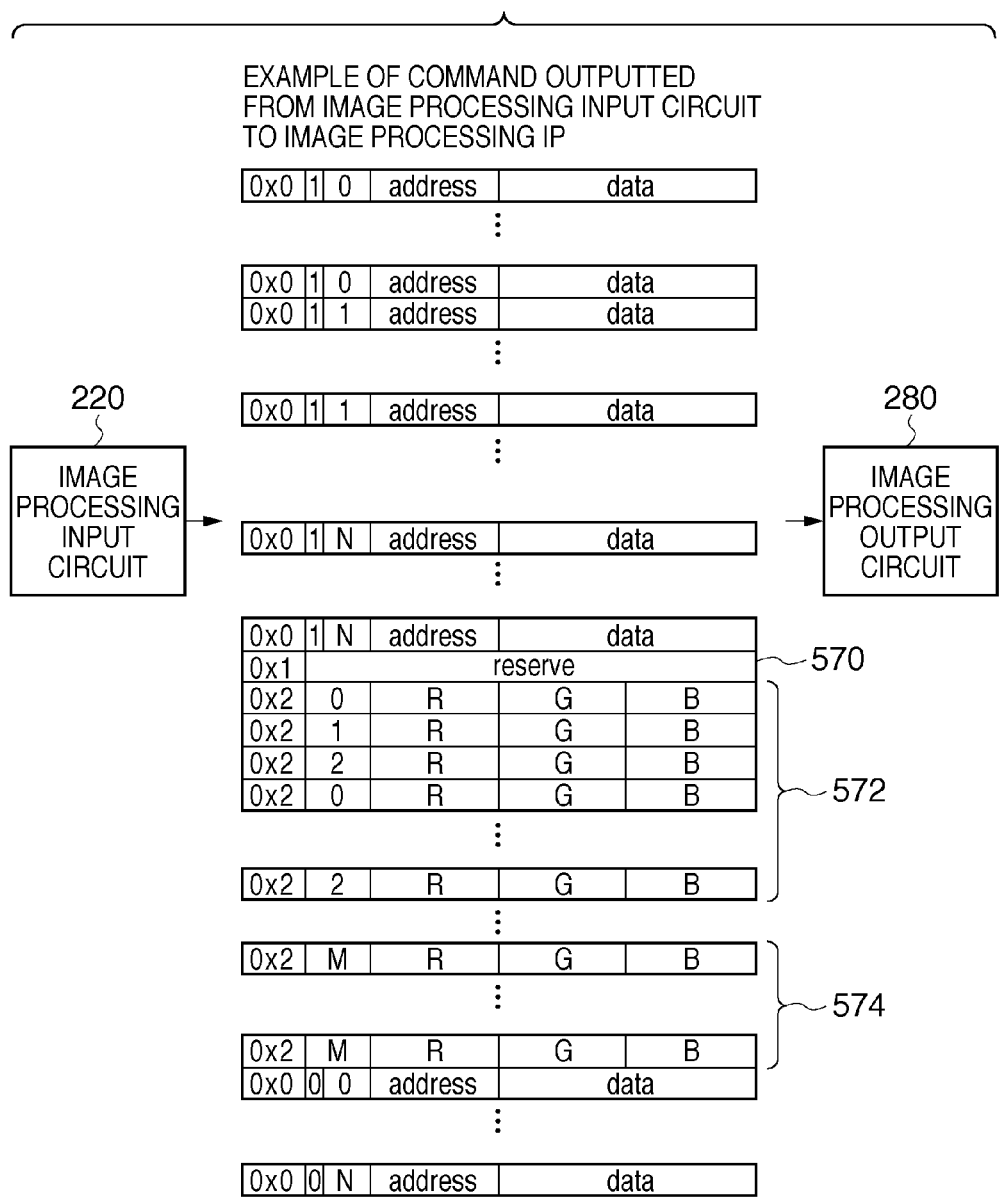
FIG. 8B is a diagram explaining commands imported into an image processing circuit.

The image processing input circuit 220 receives an input from the DMAC (Read) 210 and temporarily stores the read digital image data in the buffer 660 of the image processing input circuit 220. The image processing input circuit 220 extracts the digital image data stored in the buffer by a predetermined number of pixels from the top, converts the data into the data processing command 544, and outputs the data to the subsequent image processing circuit (S734). The following can be understood by comparing FIG. 8A, in which the display list is inputted to the image processing input circuit 220, and FIG. 8B, which is an example of command outputted from the image processing input circuit 220. More specifically, data processing commands 572 and 574 are inserted after a data acquisition command 570 in FIG. 8B, and the commands are obtained by converting digital image data 559 read from the memory into commands. In FIG. 8B, step=0, 1, 2 denote "correction data (MAX)", "correction data (MIN)", and "image data", respectively. Furthermore, step=M of the data processing command 574 denotes a data command of a different type of image processing not related to the correction process, and a value other than 0, 1, and 2 is used for M. In step 8B, although step=0, 1, 2, 0, 1, 2, ... is repeated in the data processing command 572, the image data may be repeated after the transfer of the correction data (MAX) and the correction data (MIN). In that case, the data indicates step=0, 1, 2, 2, 2, 2, ....

The subsequent image processing circuits (1) 230 to (P) 270 execute image processing in accordance with the set register values, change the R, G, and B data (S744), and output the data to the image processing output circuit 280. The image processing output circuit 280 extracts the R, G, and B data from the data processing command (S754) and performs packing in a predetermined format (S754). When the packing is completed, the image processing output circuit 280 performs register setting and activation in the DMAC (write) 290 in accordance with the set register value (S756 and S758). As a result, the DMAC 290 writes digital image data 598 (FIG. 8C) after the image processing in the RAM 106 (S792).

As described, triggered by the data acquisition command of the display list, the image processing input circuit 220 acquires various necessary data from the RAM 106 without the involvement of the CPU 102. The image processing circuit processes the data, and the image processing output circuit 280 writes the process result in the RAM 106. Although the DMAC (Read) and the DMAC (Write) are activated once in relation to a data acquisition command to simplify the description in FIGS. 11A and 11B, the present invention is not limited to this. For example, a small number of pixels of the digital image data acquired at one occasion can be designated in the register setting of the image processing input circuit 220 and the image processing output circuit 280. According to the setting, the DMACs 210 and 290 can be activated for a plurality of times for a data acquisition command to divide the command into small amounts of digital image data to execute data processing. This is advantageous in that the buffer capacity of the image processing input circuit 220 and the image processing output circuit 280, which will be described in detail below, can be reduced.

Figure 8C:
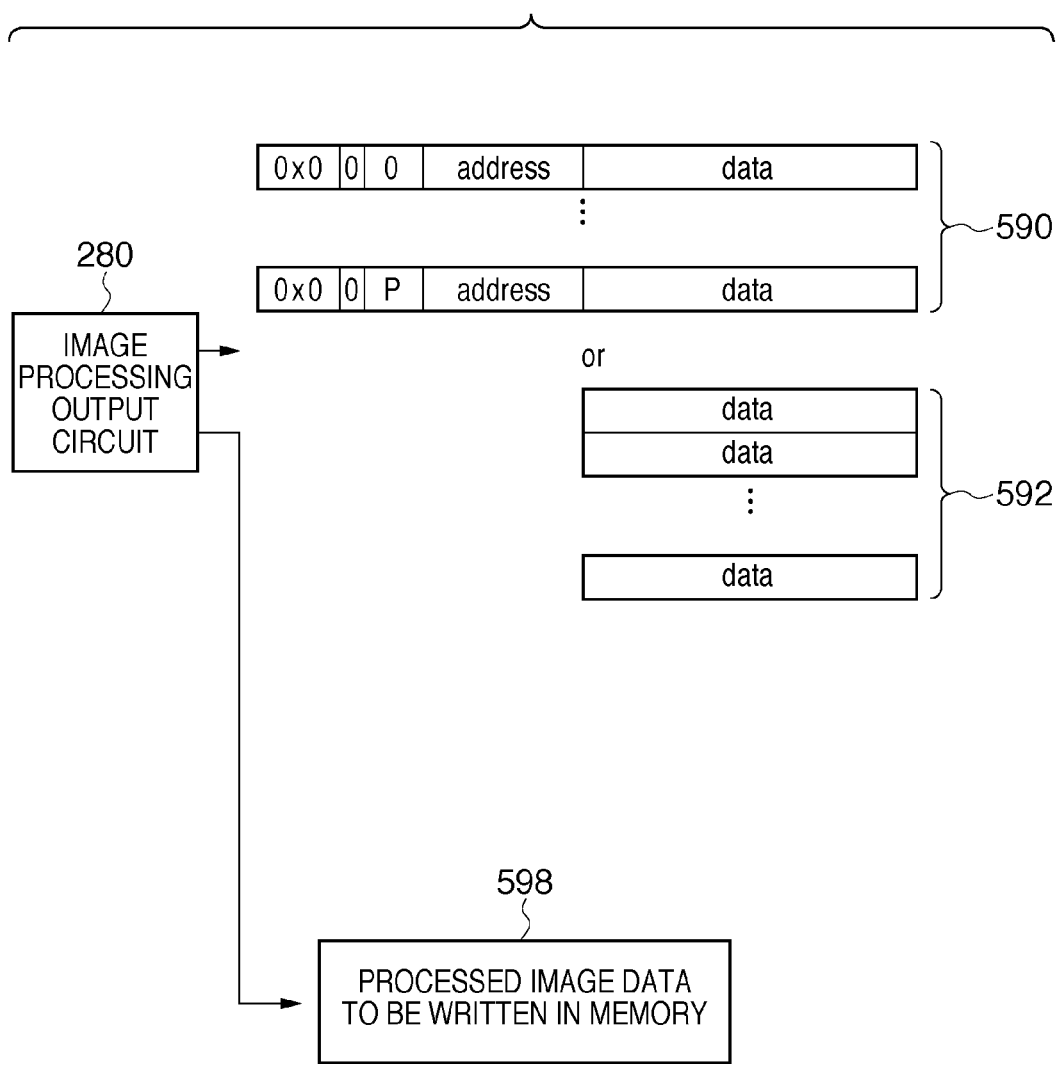
FIG. 8C is a diagram explaining data extracted from an image processing output circuit.

When the acquisition of various data for the data acquisition command is completed (S736), the analysis of the halted display list is restarted (S736 and S724). In the example of display list of FIG. 8A, a register read command 558 follows the data acquisition command 556. The commands are for reading the status values of the image processing circuits (1) 230 to (P) 270 after the image processing. As for the register read command, the image processing output circuit 280 may save the command in the RAM 106 in a format of a register read command 590 or may save data 592, in which only the read register values are extracted, in the RAM 106 (FIG. 8C). The CPU 102 can reference the data of the RAM 106 to recognize the operation status of the image processing unit 150.

There is a completion command (not shown) at the end of the example of the display list of FIG. 8A, and the image processing input circuit 220 outputs the completion command to the subsequent image processing circuit (S739). Each image processing circuit outputs the completion command to the subsequent circuit (S749). When the completion command is received, the image processing output circuit 280 notifies the CPU 102 of a completion interrupt of the image processing (S759). The CPU 102 ends the present process when the completion interrupt is received (S719). After a series of autonomous operations in accordance with the display list described so far, the image processing unit 150 waits until activated again by the CPU 102.

Figure 18:
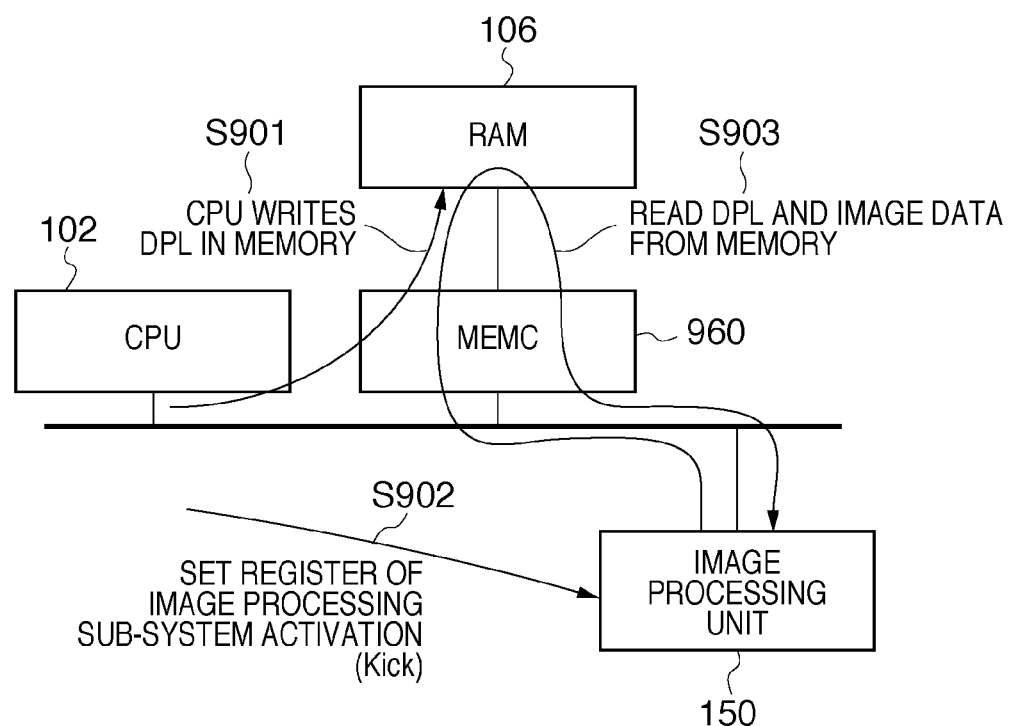
FIG. 18 is a diagram explaining a configuration and an operation of the image processing apparatus.

If the data acquisition command is inserted for a plurality of times in a display list, it is obvious that the image processing for a plurality of band areas can be realized by repeating the operation of the data acquisition command for the same number of times. FIG. 18 is a diagram explaining a process during image processing by the CPU 102 according to the present embodiment. The CPU 102 writes the display list (DPL) in the RAM 106 (S901) and writes a value indicating the activation in the kick register of the image processing unit 150 (S902). Subsequently, the image processing unit 150 independently reads the DPL and the image data from the RAM 106 to execute image processing. Therefore, after instructing the activation to the image processing unit 150, the CPU 102 is released from the image processing, and the process load of the CPU 102 is reduced.

Figure 12:
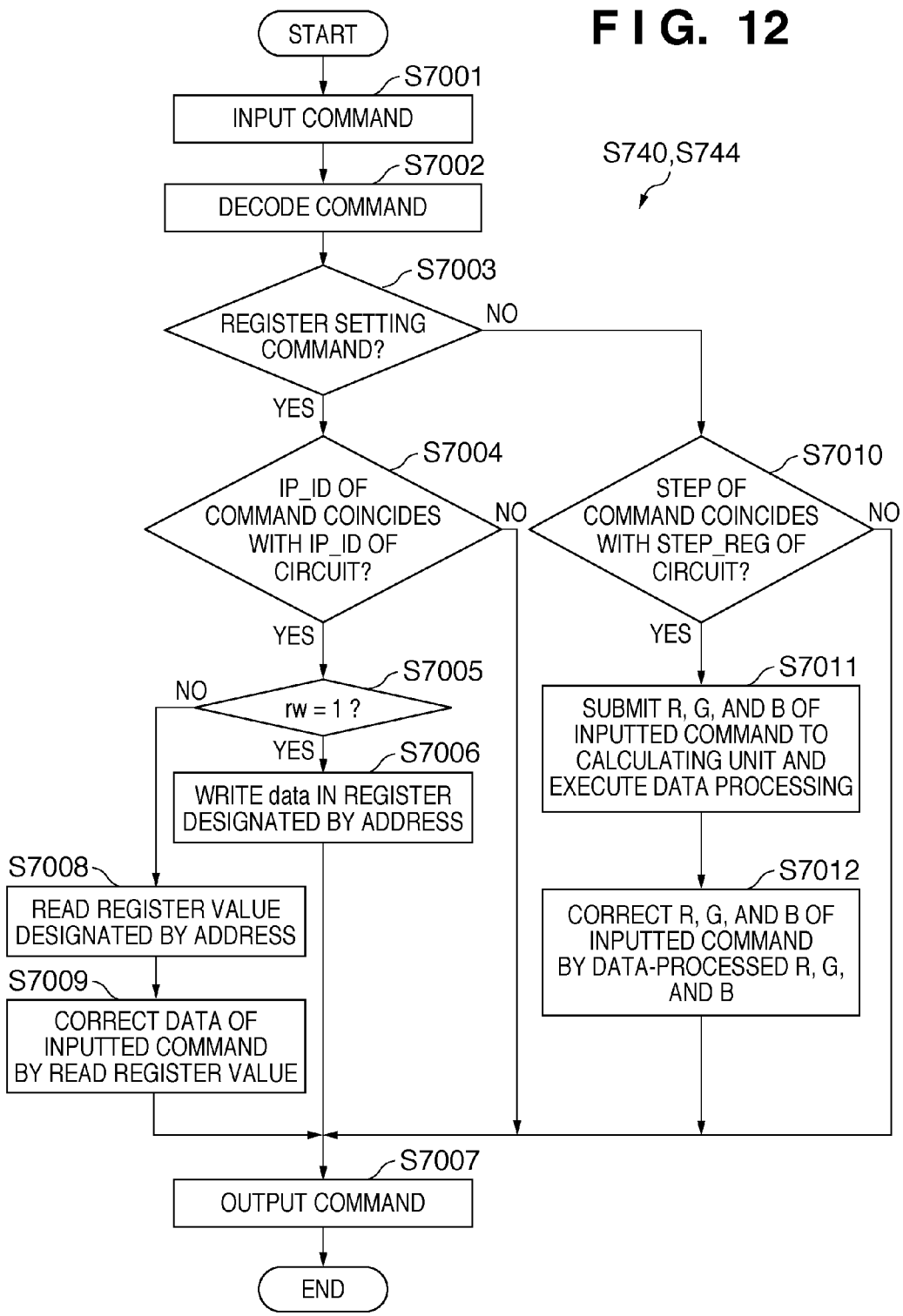
FIG. 12 is a flow diagram explaining an operation of the image processing circuit.
Figure 17:
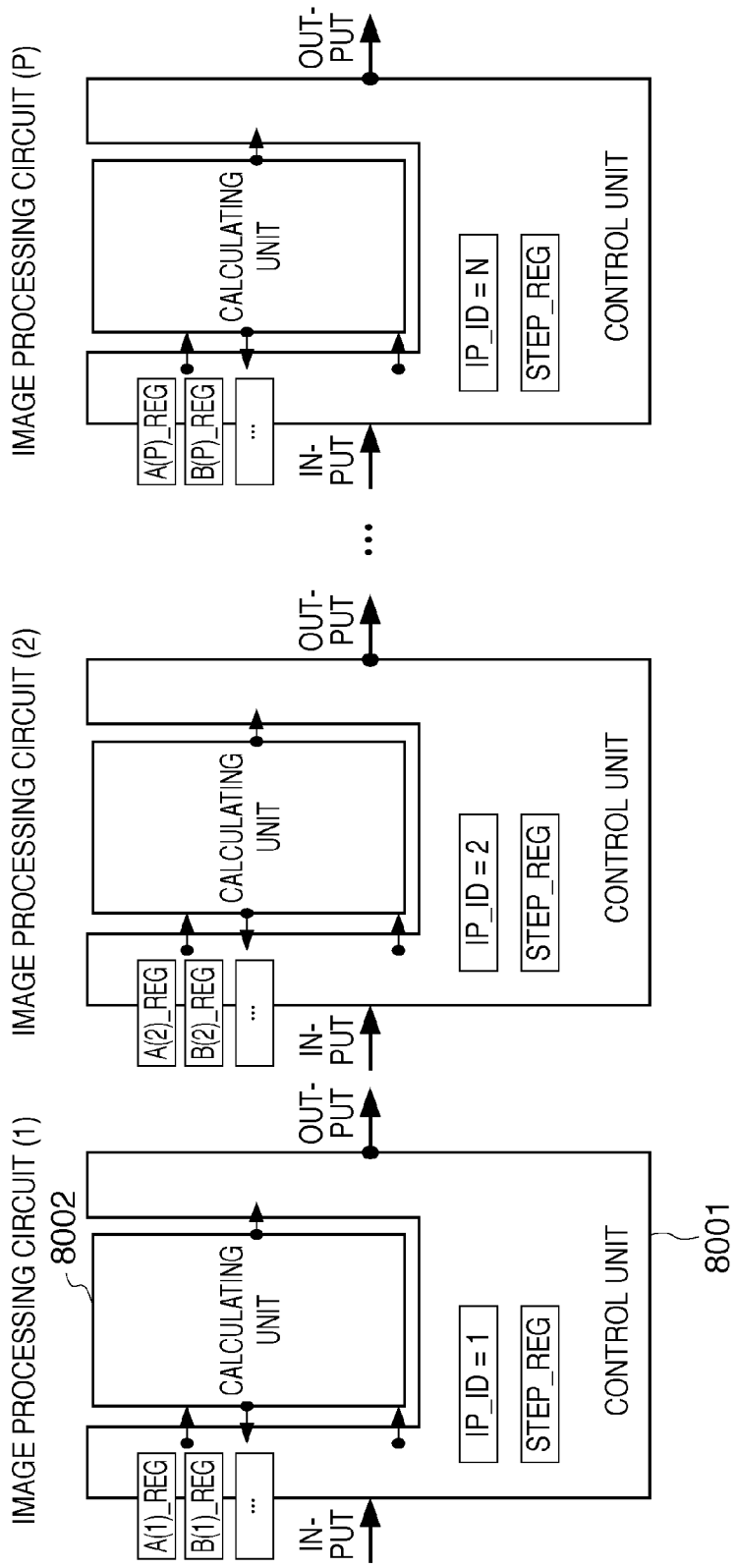
FIG. 17 is a diagram explaining an operation of the image processing circuit.

Summaries of the operations of the image processing circuits (1) 230 to (P) 270 are described in FIGS. 12 and 17, and image processing will be simply described. The image processing circuits execute the process shown in FIG. 12 in S740, S742, and S744 of FIG. 11B. More specifically, when a circuit in an upper stage inputs a command, a control unit 8001 of the image processing circuit analyzes the command and determines whether the command is a register control command or a data processing command (S7001, S7002, and S7003). If the command is a register control command, the control unit 8001 determines whether ip_id of the command coincides with the value registered in the IP_ID register of the image processing circuit and outputs the command to the downstream without change if the values do not coincide (S7004 and S7007). If ip_id of the command coincides with the value registered in the IP_ID register of the image processing circuit, the control unit 8001 determines whether the command is a register read command or a register write command based on rw of the command (S7005). If the command is a register write command, the control unit 8001 writes data designated in accordance with the command in a designated address and outputs the command to the downstream (S7006 and S7007). If the command is a register read command, the control unit 8001 writes the data read from the designated address in the data area of the command and outputs the data to the downstream (S7008, S7009, and S7007).

On the other hand, if the command is a data processing command, the control unit 8001 determines whether step of the command coincides with STEP_REG of the image processing circuit and outputs the command to the downstream without change if the values do not coincide (NO in S7010, S7007). If the values coincide, the control unit 8001 submits the R, G, B data (or correction data) of the command to a calculating unit 8002, and the calculating unit 8002 executes predetermined data processing (S7011). The control unit 8001 replaces the processed data by data of the data processing command and outputs the data to the downstream (S7012). If the command is a data acquisition command, the command is just outputted to the downstream without change. Therefore, the process is not illustrated. For example, in the correction process, the image processing input circuit 220, triggered by the data acquisition command, activates the DMAC (read) 210 to read the read image and the correction data from the RAM 106. The image processing input circuit 220 extracts pixel-by-pixel data (pixel values) from the packed read image, correction data (MAX), and correction data (MIN) described in FIG. 6 and adds data processing identification information "step" to the data. The image processing input circuit 220 converts the data into a data processing command in the order of the read image, the correction data (MAX), and the correction data (MIN) and outputs the command through the internal bus 225. In FIG. 17, A(1)_REG, A(2)_REG, B(1)_REG, etc. denote setting values specific to the image processing that are necessary for the calculating units to perform calculations.

One of the image processing circuits (1) 230 to (P) 270 corrects the individual differences of the read elements of the sensor device shown in [Expression 1]. One of the image processing circuits (1) 230 to (P) 270 executes image processing such as an input color correction process, a spatial filtering process, a color space conversion, a density correction process, and a halftone process. For example, it is assumed that the image processing circuit (1) 230 is the circuit that corrects the individual differences of the read element of the sensor device shown in [Expression 1]. In this case, the image processing circuit (1) 230 sequentially receives the read image, the correction data (MAX), and the correction data (MIN) attached with different data processing identification information "step" and distinguishes the meaning of the data based on the data processing identification information "step" to calculate [Expression 1]. The image processing circuit (1) 230 then replaces R, G, and B of the data processing command by the corrected R, G, and B and transmits the data to the subsequent image processing circuit. The data processing identification information "step" may be replaced by another value at this point. A data processing command to be received is set in the control unit 8001 of the image processing circuit by a preset STEP_REG register. In the example of correction, three pieces of data processing identification information "step" designated in the read image, the correction data (MAX), and the correction data (MIN) are set to the STEP_REG register. The data processing identification information "step" for the replacement after the image processing is also designated in the register.

In the present embodiment, image processing specific to the band processing is executed to realize saving of the capacity of the delay memory in local (near) image processing such as a spatial filtering process. Furthermore, a correction process or image processing of image data based on a plurality of image data and/or correction data is realized. To attain the objects, the image processing is executed in a band area coordinate system different from the coordinate system of the digital image data (main-scanning direction—sub-scanning direction) in the present embodiment.

Figure 9:
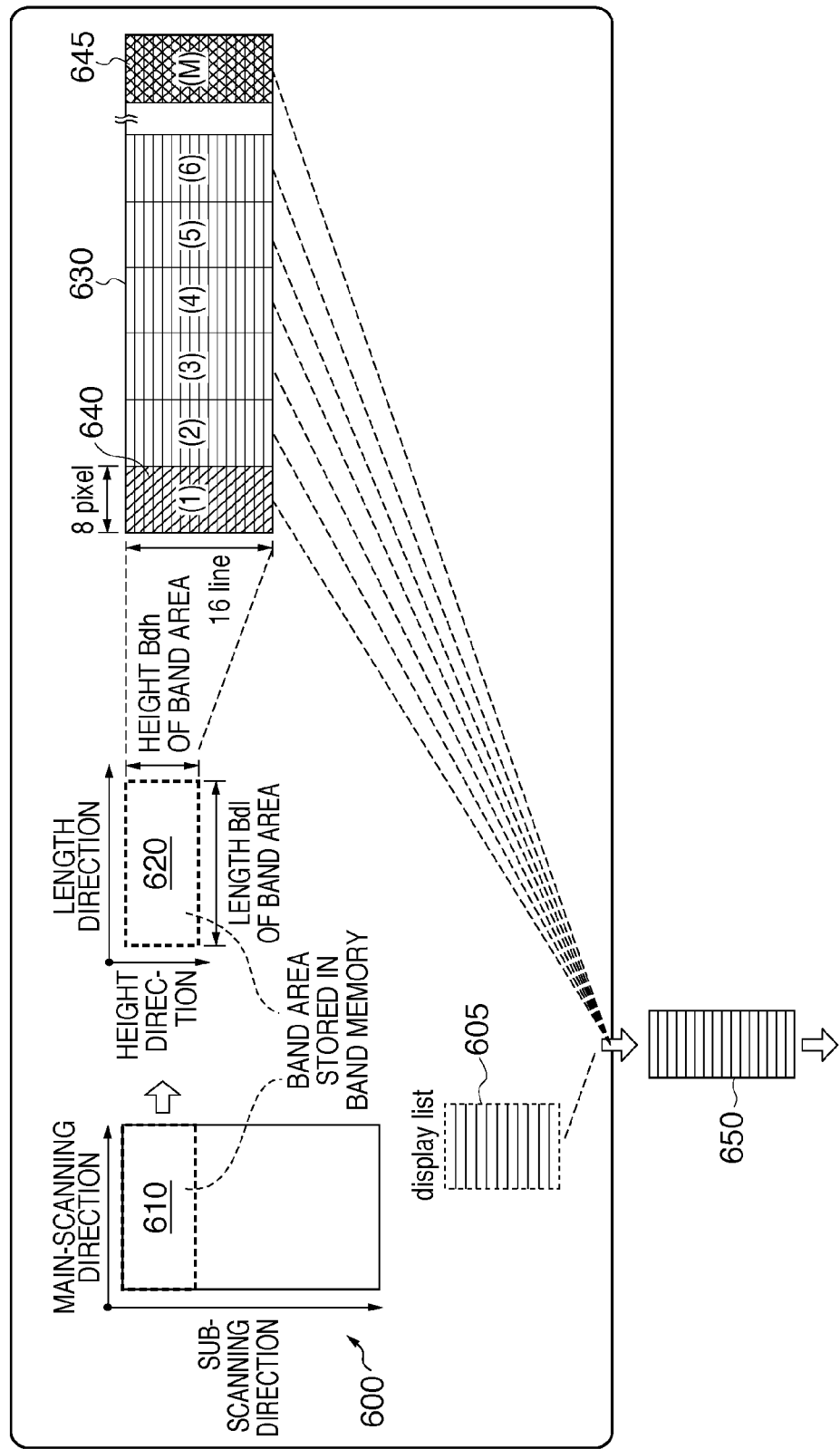
FIG. 9 is a diagram explaining an example of operation until the output of pixel data.
Figure 10A:
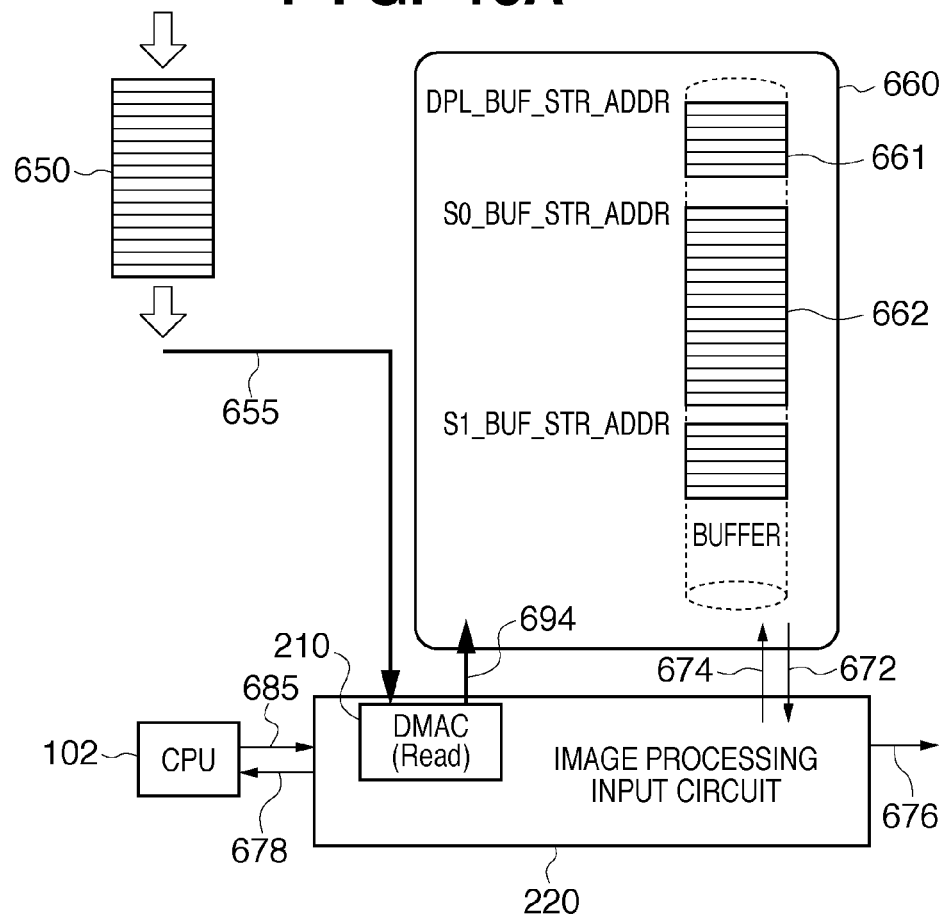
FIGS. 10A and 10B are diagrams explaining an example of operation until the output of pixel data.
Figure 10B:
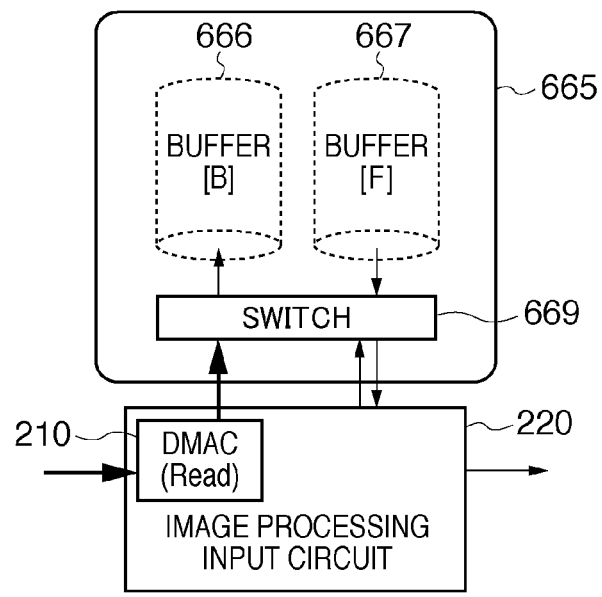

FIGS. 9, 10A, and 10B explain a method in detail, in which the RAM 106 inputs the display list, the image data, and the correction data into the image processing input circuit 220 when the image processing apparatus of the present embodiment is used. A display list 605 and image data 600 are stored in the RAM 106. Reference numeral 600 denotes the entire image of the image data. A band area 610 is extracted from the data, and image processing is applied. As shown with reference numerals 620 and 630, a height Bdh of the band area 610 to be processed in the band area coordinate system is 16 lines (16 pixels), and a length Bdl of the band area is 8×M pixels. The CPU 102 of FIG. 10A first sets a top address, a consecutive read amount (how many consecutive times 32-byte data will be read), an increment address, and the number of repetitions of the display list 605 in the RAM 106 through a control bus 685. In the illustrated example, the top address is DPL_STR_ADDR of the DPL (2) area of FIG. 5, the consecutive read amount is DPL_DMA_LENGTH times (32 byte), and the number of repetitions is once (since the number of repetitions is 1, the increment address can be 0). Although the acquisition of the correction data is not described in FIG. 9, the correction data is also read from the RAM 106 in the same way as the image data as shown in FIG. 19A.

As shown in FIG. 10A, the shared buffer 660 accessible for data by the DMAC 210 and the image processing input circuit 220 exists therebetween. Therefore, the CPU 102 also instructs the DMAC 210 for a writing top address of a shared buffer, the address being a writing location of the display list of the acquired data, through the control bus 685. In the illustrated example, DPL_BUF_STR_ADDR is the address set as the writing top address for temporary storage in reference numeral 661. After receiving an instruction from the image processing input circuit 220, the DMAC 210 reads the display list 605 of the RAM 106 (650) and stores the display list 605 in the area 661 of the shared buffer 660 through a shared bus 694. The image processing input circuit 220 then analyzes the display list 605.

The top address, the consecutive read amount (how many consecutive times 32-byte data will be read), the increment address, and the number of repetitions of the band area 610 of the RAM 106 are set by the register control command of the display list 605. In the illustrated example, the top address is S0_IMG_STR_ADDR of FIG. 4, the consecutive read amount is once (32 bytes), the increment address is 32 byte×M which is one line of data, and the number of repetitions is 16 times. A writing top address of the shared buffer is also instructed, the address being a writing location of the digital image data acquired by the register control command. In the illustrated example, S0_BUF_STR_ADDR is set for temporarily storing the data in the area 662 of the shared buffer 660. After receiving the instruction from the image processing input circuit 220, the DMAC 210 reads one of the areas (1) 640 to (M) 645 of the band areas 630 in the image data stored in the RAM 106 (650). The acquired data is stored in the area 662 of the shared buffer 660 through the shared bus 694.

To acquire read data 672, the image processing input circuit 220 accesses and reads the shared buffer 660 through a control signal 674, such as a chip select signal and an address signal. The image processing input circuit 220 selects pixel-by-pixel data (pixel values), converts the data into the data processing command, and outputs the command to an internal bus 676 (equivalent to 225 described in FIG. 2A) of the image processing unit. As shown with reference numeral 665 of FIG. 10B, the shared buffer 660 may comprise two or more buffers 666 and 667. Since the DMAC 210 and the image processing input circuit 220 share a buffer in the example of FIG. 10A, writing to the shared buffer 660 and reading from the shared buffer 660 are operated in a time-division manner. On the other hand, according to the configuration of the shared buffer 665 of FIG. 10B, the DMAC 210 can transfer desired data from the RAM 106 to the shared buffer 666, while the image processing input circuit 220 executes an acquisition process of pixel data from the shared buffer 667. More specifically, double-bank buffers are constituted, and processes of the DMAC 210 and the image processing input circuit 220 can be executed in parallel. The same operation can be repeated M times for the areas (1) 640 to (M) 645 to apply image processing to the band area 610 of the image data.

In this way, predetermined register setting is performed in accordance with the display list, and image data is acquired from the RAM 106 to the shared buffer. As for the remaining two correction data, the display list is created to sequentially acquire necessary data by the same operations as for the image data, with the number of repetitions set to the DMAC 210 being also once (thus, the height of the band area is one line). Although a one-dimensional correction process executed in relation to a line sensor including one pixel line has been described, the present invention is not limited to this. An example of a similar correction process includes a correction process for a two-dimensional display device used in a flat-screen TV. In the two-dimensional display device, there are individual differences between the two-dimensionally spread display elements. Therefore, two-dimensional correction data is used to execute a correction process, and it is clear that the present invention can be applied.

Another embodiment will now be described. Configurations and steps with the same functions as in the above embodiment will be designated with the same reference numerals, and the description of the same configurations and functions will not be repeated.

A combining process 1020 and an I/P conversion 1030 shown in FIGS. 19 B and 19C will be considered. FIG. 19B shows image processing for combining a plurality of rendering images in accordance with blending data (α value). For example, if there are two rendering images to be combined, a combining expression such as [Expression 2] below is used to apply a combining process to each pixel. The blending data (α value) is the same for all pixels in the rendering images in some cases, and two-dimensional blending data (α value) varies in each pixel in the rendering images in other cases. The blending data (α value) of the latter case is $$X = P2 \times A + P1 \times (1024 - A)/1024 \quad \text{[Expression 2]}$$

In this case, P1 denotes a pixel value of a first rendering image, P2 denotes a pixel value of a second rendering image, A denotes an α value of each pixel in blending data, and X denotes a pixel value after combination (when α value is a 10-bit digital signal). FIG. 19B shows an example of the latter combining process. In the combining process, if the number of rendering images to be combined is N, it is obvious that the number of pixel data and blending data (α value) necessary in the process is different from the example. FIG. 19B shows that two images 1051 and 1052 as well as blending data 1053 are used to generate a combined image 1054.

Figure 19C:
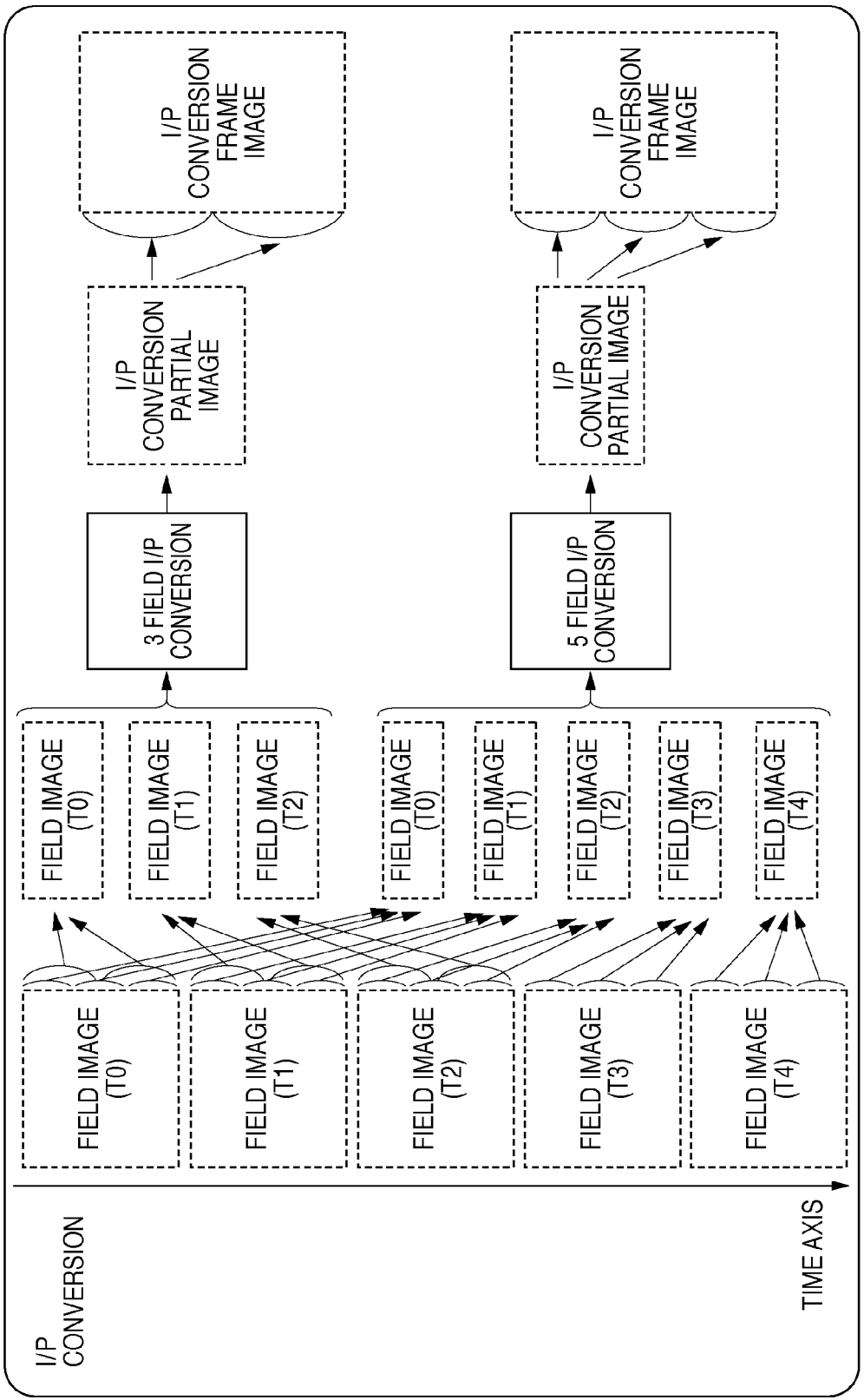

FIG. 19C shows a process of executing an adaptive spatial filtering process by referencing a plurality of field images continuous in the time axis direction, such as interlace progressive conversion (hereinafter, abbreviated as I/P conversion) of moving images. In general, in image processing of referencing a plurality of field images such as the I/P conversion, high-quality image processing can be executed if a larger number of field images are used to execute the adaptive process. However, a plurality of field images are usually stored in an inexpensive external memory, such as DRAM, connected to a semiconductor chip (such as ASIC) mounted with an image processing circuit. Therefore, a plurality of field images need to be read every time from the external memory for the I/P conversion, and the images need to be inputted to the I/P conversion circuit.

An image processing apparatus in a memory bandwidth capable of reading up to three full-high-vision resolution field images for the I/P conversion will now be considered. If the image processing apparatus applies the I/P conversion to a low-resolution moving image such as NTSC (720×480i), it is clear that high-quality I/P conversion can be performed by referencing a larger number of field images as compared to the full-high-vision resolution moving images. FIG. 19C shows an example of I/P conversion capable of handling three fields or five fields. In such I/P conversion, if the usable memory bandwidth is constant, it is important to flexibly switch the image processing method in accordance with the resolution and the number of reference fields to execute high-quality image processing as much as possible.

The correction process is different from the embodiment described above in that various data is inputted through the video input unit 130 of FIG. 1 and that the video display unit 160 outputs the processed data to a display apparatus such as a display. As opposed to the embodiment described above, the plurality of image data and blending data necessary to apply image processing to the image data are two-dimensional data in the present embodiment. The same data value is not repeated in the sub-scanning direction as in the correction data (MAX and MIN) in the embodiment described above. Therefore, the method of storage is the same as S0_IMG to be processed (coordinate system similar to the window's area 440 is used), such as S1_IMG, S2_IMG, and S3_IMG of FIG. 4. To simplify the description, it is also assumed in a second embodiment that various image data and blending data are in data formats of FIG. 6.

The creation of the display list satisfying the conditions realizes the image processing. The CPU 102 sets the number of various data necessary in the image processing as the number of acquired data S. In the case of a combining process of two rendering images, three types of data (one piece of image data to be processed and two pieces of data, that is image data to be combined and blending data) are necessary, and S=3. In the case of I/P conversion for three field images, image data of one field in the past and one field in the future are necessary for the field image at the time of processing. Therefore, three types of data are necessary, and S=3. In the case of I/P conversion for five field images, image data of two fields in the past and two fields in the future are necessary for the field image at the time of processing. Therefore, five types of data are necessary, and S=5.

The height of the band areas and the read top address of the shared buffer are calculated. Based on the format described above, 32-byte data indicates one line of image data. In the present embodiment, other image data and blending data are also 32 bytes (one line) to process the one line of image data. Therefore, the capacity of the shared buffer is 256 bits (32 bytes)×BL words, and the following calculation will be described by assuming that BL lines of various data can be held. The minimum transfer unit of image data is 32 bytes (equivalent to one word (one line) of the shared buffer), and the minimum transfer unit of the various data for processing the image data is 32 bytes (equivalent to one word (one line) of shared buffer). Therefore, to process the minimum transfer unit 32 bytes of image data, 32 bytes×3 of various data are necessary in the combining process of two rendering images. The same applies to the I/P conversion for three field images. In the I/P conversion for five field images, 32 bytes×5 of various data are necessary. Therefore, the following results are obtained for the height of the band areas (the number of lines).

Combining Process of Two Rendering Images $$BL \text{ lines}/(1 \text{ line}+2 \text{ lines}) = BL/3$$

I/P Conversion for Three Field Images $$BL \text{ lines}/(1 \text{ line}+2 \text{ lines}) = BL/3$$

I/P Conversion for Five Field Images $$BL \text{ lines}/(1 \text{ line}+4 \text{ lines}) = BL/5$$

More specifically, a value obtained by dividing the number of buffer lines BL by a total value of the minimum transfer unit, or 32 bytes, of image data (equivalent to one word (one line) of the shared buffer) and the minimum transfer unit of data necessary to process the minimum transfer unit, or 32 bytes, of image data is the height of the band areas.

The top addresses of the shared buffer are addresses arranged at equal intervals, each separated by the height of the band areas (the number of lines). A register control command of the display list is generated in accordance with the setting of the band height, and the display list is stored in the display list storage area of the RAM 106.

As described, according to the configuration, the CPU is released from the process of setting and activating the register of the DMAC and setting the register of the image processing during every transfer completion interrupt of the DMAC and image processing completion interrupt of the image processing unit. Therefore, the process load for controlling the DMAC of the CPU is reduced. Furthermore, the reduction in the circuit size in local image processing and the high-speed processing can be attained, while realizing the capacity saving of the delay memory.

Figure 2B:
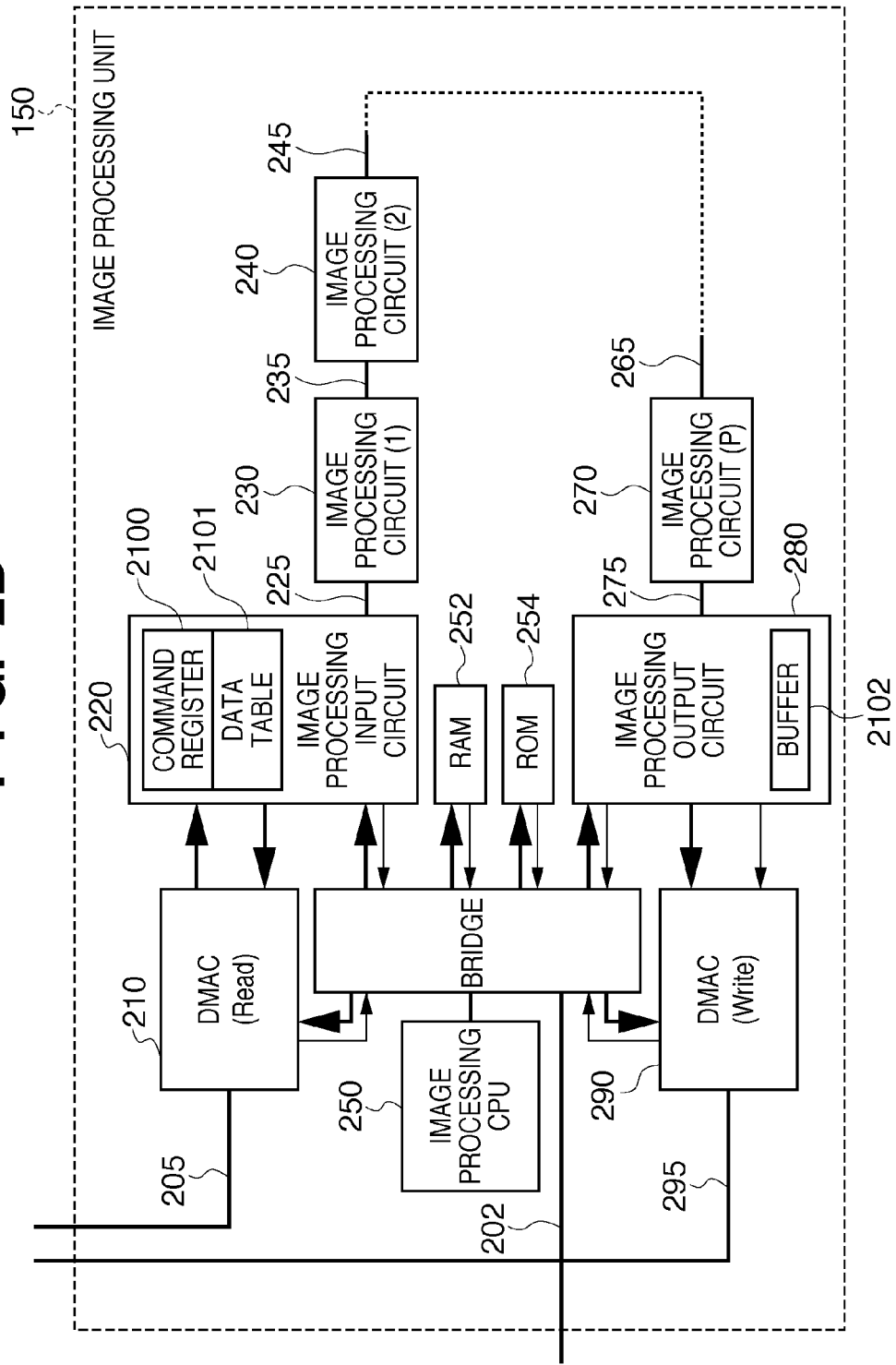

Another embodiment will be described further. Configurations and steps with the same functions as in the above configurations will be designated with the same reference numerals, and the description of the same configurations and functions will not be repeated. FIG. 2B is a block diagram showing an example of configuration of the image processing unit 150. In the image processing unit 150, the image processing CPU 250 is connected with the RAM 252 and the ROM 254 accessible from the image processing input circuit 220, the image processing output circuit 280, and the image processing CPU 250, through a bridge. The image processing input circuit 220 includes a command register with the register group described in FIG. 13, and the image processing input circuit 220 generates register control commands and data processing commands based on the register setting from the image processing CPU 250 through a dedicated bus. The image processing input circuit 220 can transmit the commands to the subsequent image processing circuits (1) 230 to (P) 270 to realize the image processing calculation desired by the image processing CPU 250 using one of the image processing circuits (1) 230 to (P) 270. The image processing described below is characterized in that a command generated by the image processing CPU 250, which executes image processing different from image processing by the image processing unit 150, temporarily uses calculation resources of the image processing unit 150. To distinguish the image processing from the image processing of PULL-type operation as an autonomous operation of the image processing unit 150 following the display list, the image processing will be called image processing of PUSH-type operation of the image processing CPU 250.

Figure 13:
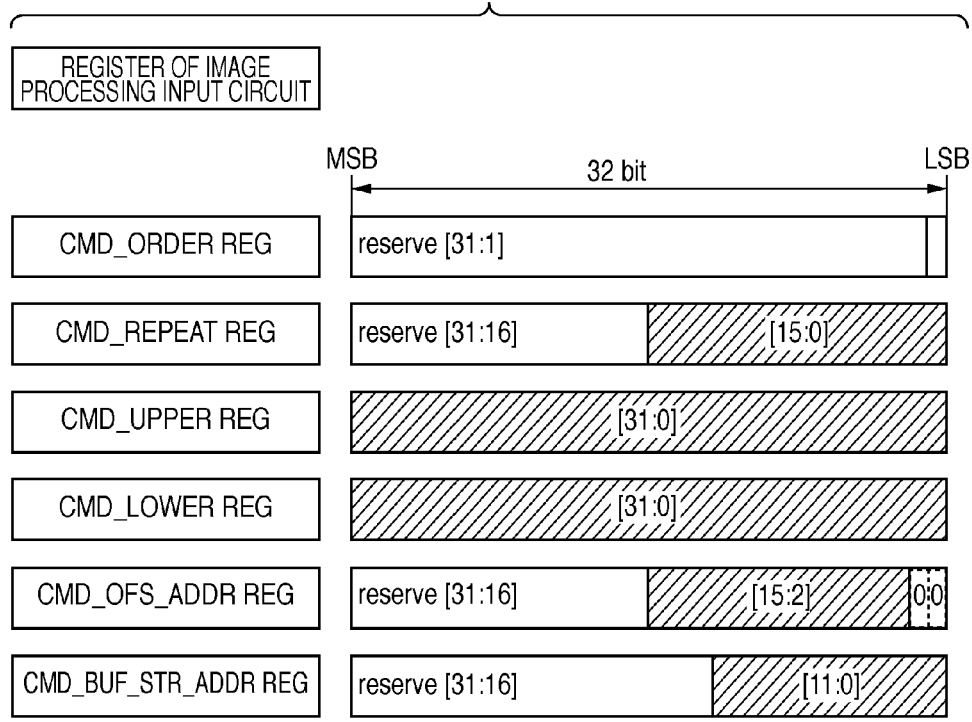
FIG. 13 is a diagram explaining a command register included in an image processing input circuit.

A command register 2100 of the image processing input circuit 220 includes a command register group as shown in FIG. 13. The number of register control commands or data processing commands generated at one occasion by the image processing CPU 250 is designated in a CMD_REPEAT register. A CMD_UPPER register indicates upper 32 bits of a 64-bit length command, and a CMD_LOWER register indicates lower 32 bits. The two are connected to form one 64-bit length command. A CMD_OFS_ADDR register indicates an increment of address, and a CMD_BUF_STR_ADDR denotes a top address of a data table 2101.

Figure 14:
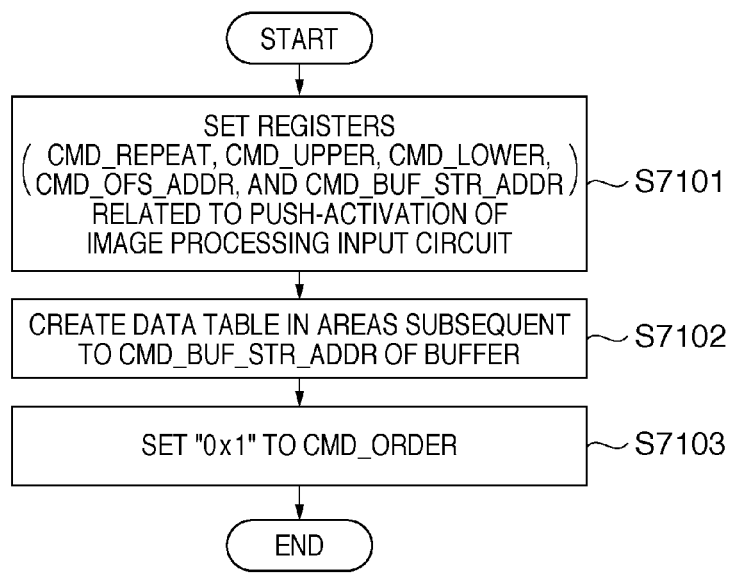
FIG. 14 is a flow diagram explaining an operation of an image processing CPU.

A basic operation of the image processing CPU 250 will be described with reference to the flow chart of FIG. 14. A generation process of a command by the image processing input circuit 220 will be described with reference to the flow chart of FIG. 15. A collaborative operation of the image processing CPU 250 and the image processing unit 150 will be described with reference to FIGS. 16A and 16B.

The image processing CPU 250 first sets various registers, such as CMD_REPEAT, CMD_UPPER, CMD_LOWER, CMD_OFS_ADDR, and CMD_BUF_STR_ADDR, shown in FIGS. 13 (S7101 and S7301). At this point, a data table used in the command generation is set if necessary (S7102). The data table holds data values corresponding to the register write command and data to be processed in the data processing command. Subsequently, when the image processing CPU 250 writes "0x1" in a CMD_ORDER register (S7103 and S7302), the image processing input circuit 220 ("Push-CMD Order" sequencer) is activated. The image processing input circuit 220 generates a desired command for the number of times designated in a CMD_REPEAT register and outputs the command to the subsequent image processing circuits (1) 230 to (P) 270 (S7320 and S7322). When the command generation is completed, the image processing input circuit 220 automatically generates a completion command and outputs the command to the subsequent image processing circuits (1) 230 (S7324). The processes of S7401 to S7424 are similar to S7301 to S7324. However, in S7420, a data processing command is generated and outputted to the image processing circuit.

The image processing circuits (1) 230 to (P) 270 execute necessary processes based on the operation code "opcode", the circuit identification information "ip_id", and the data processing identification information "step" and outputs the data to subsequent stages (S7340, S7344, S7440, and S7444). The operation of the image processing circuit is as described in the above embodiments. If the command is a read command of a register control command, the image processing output circuit 280 stores a register read value to the RAM 106 (main memory) or the RAM 252 accessible by the image processing CPU 250 (S7360). If the command is a data processing command, the image processing output circuit 280 stores the image-processed data in the RAM 252 accessible by the image processing CPU 250 (S7460). Alternatively, the DMAC 290 may be used to store the image-processed data in the RAM 106 (main memory). If the command is a completion command, the image processing output circuit 280 notifies the image processing CPU 250 of a completion interrupt (S7354 and S7464).

Figure 16A:
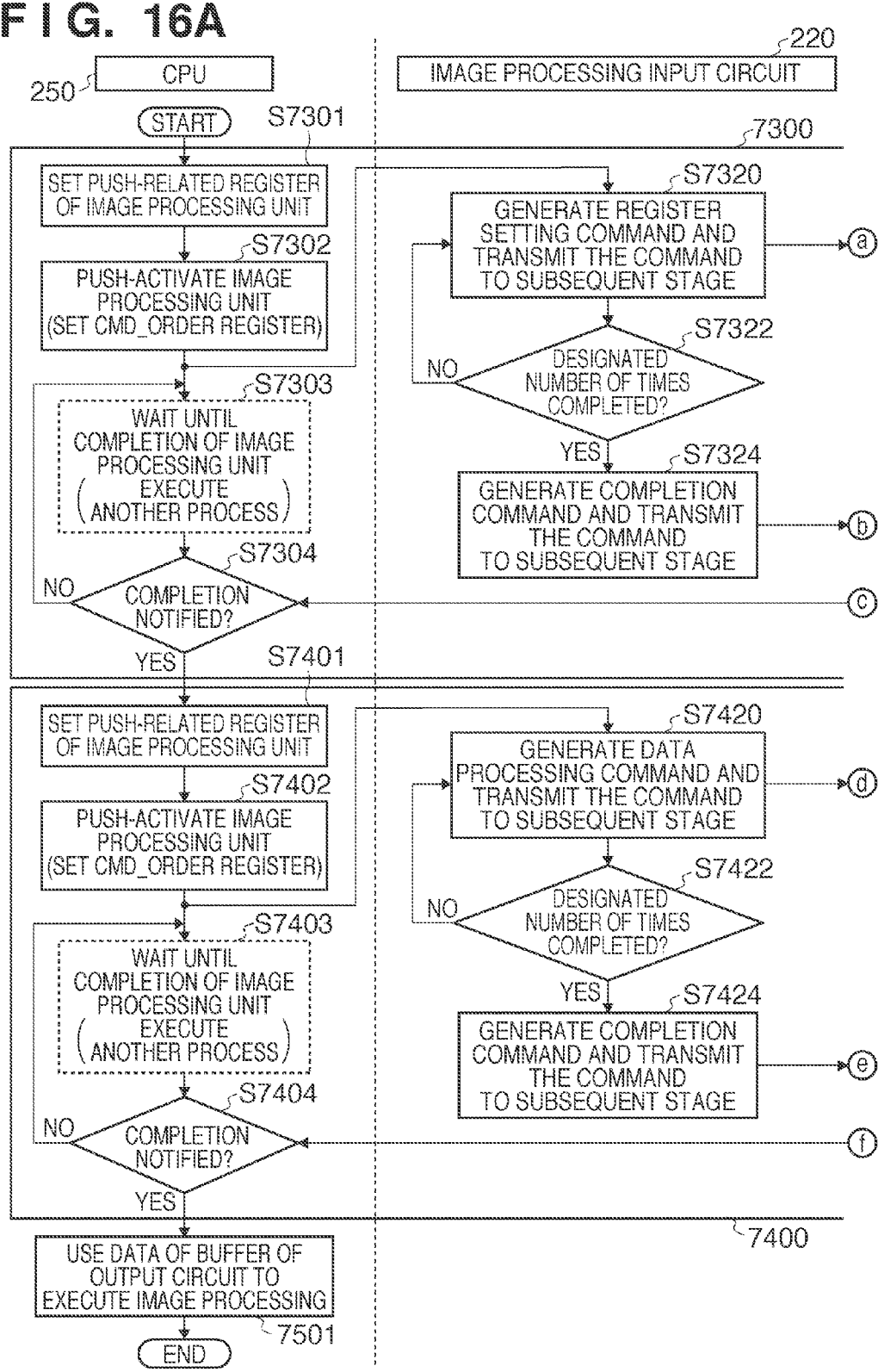
FIGS. 16A and 16B are flow diagrams explaining an example of image processing.
Figure 16B:
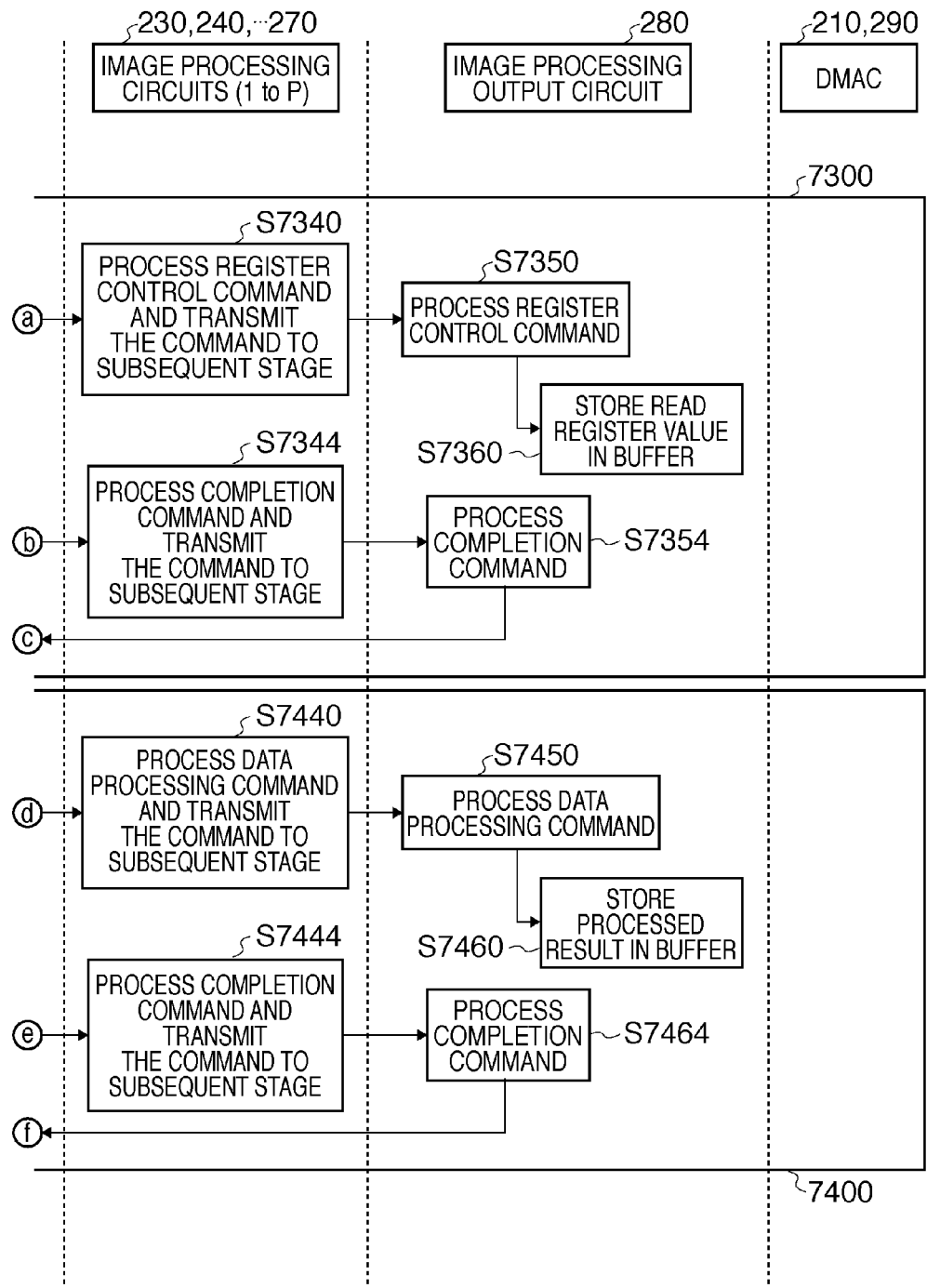

As in a process 7300 of FIGS. 16A and 16B, register setting is usually performed by outputting a register control command to one of the image processing circuits (1) 230 to (P) 270 necessary for desired image processing. As in a process 7400, image processing is executed by outputting a data processing command to one of the image processing circuits (1) 230 to (P) 270 necessary for desired image processing. The image processing circuits (1) 230 to (P) 270 are pipeline circuits, and if the number of data processing commands to be generated is large, the processing capacity is higher than in the execution by the image processing CPU 250. The image processing CPU 250 uses the calculation result stored by the image processing output circuit 280 in the RAM 252 to execute an adaptive process with software.

Figure 15:
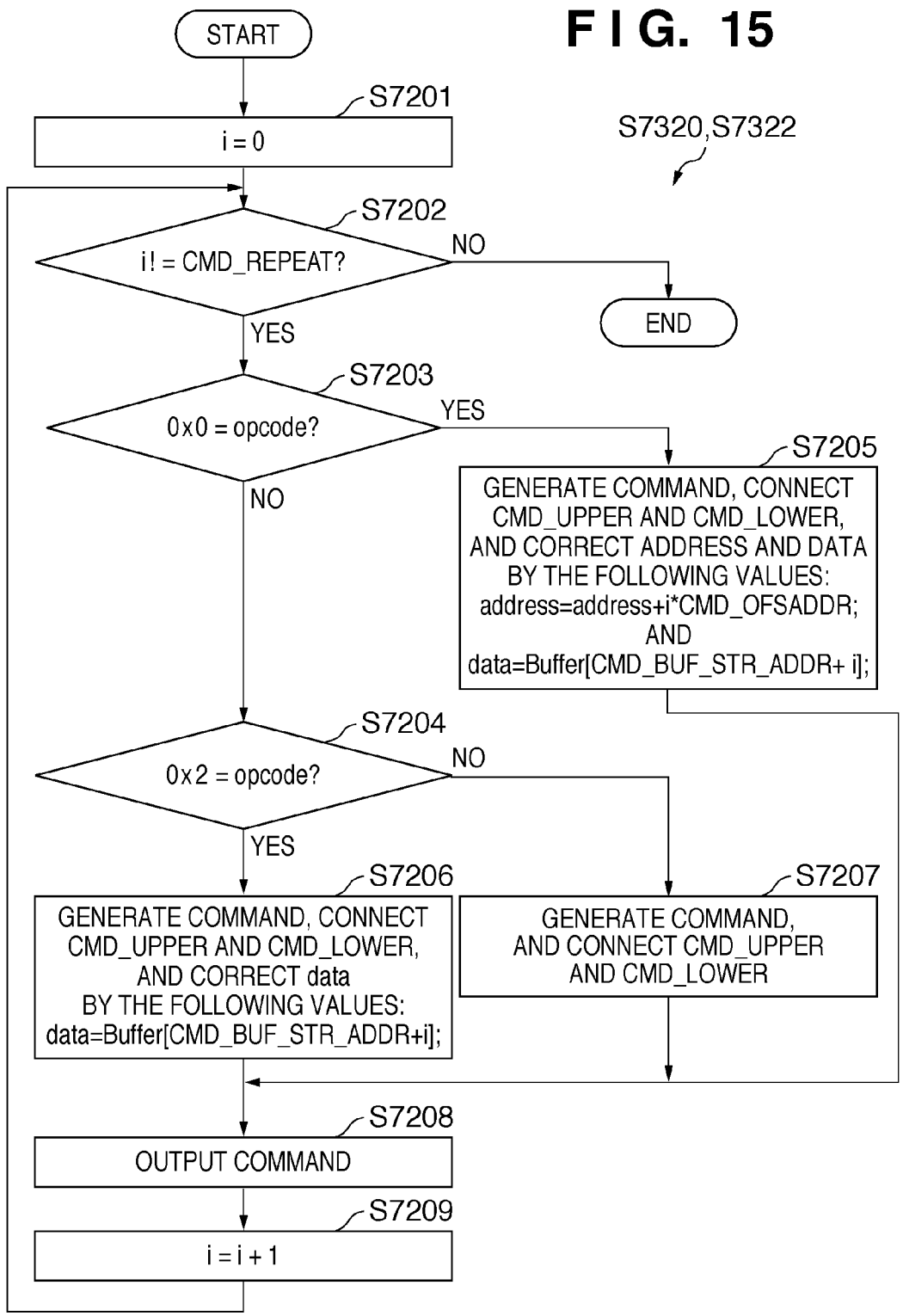
FIG. 15 is a flow diagram explaining a generation operation of a command.

FIG. 15 shows a flow chart showing details of a method of generating a command by the image processing input circuit 220. Since upper 8 bits of the CMD_UPPER register indicates "opcode", the image processing input circuit 220 can discriminate which type of command the image processing CPU 250 would generate (S7203 and S7204). If the desired command is a register control command, the process proceeds to S7205. In S7205, if the command is further a register write command, an address designated by the CMD_OFS_ADDR register is added to lower 16-bit "address" of the CMD_UPPER register to form upper 32 bits of the command.

Since the lower 32 bits provide a data area, data is acquired from a preset data table to set the lower 32 bits. The upper 32 bits and the lower 32 bits are connected to form a register control command (register write command). On the other hand, if the command is a register read command in S7205, the lower 32 bits are fixed to 0×0. If the desired command is a data processing command (S7206), the upper 32 bits and the lower 32 bits are connected, and data is acquired from the data table 2101 to make a replacement for R, G, and B to form a data processing command. If the command is another command, the CMD_UPPER register and the CMD_LOWER register are connected to form a command (S7207). The command generated this way is outputted to a lower image processing circuit (S7208). The foregoing process is repeated for the number of times registered in CMD_REPEAT (S7201, S7202, and S7209). The data acquisition from the data table is not indispensable. If the register control command is a register read command, the data area can be any value, and the data table does not have to be used. Therefore, another register may be provided to switch the validity and the invalidity of the data acquisition from the data table.

The image processing circuits (1) 230 to (P) 270 discriminate the data processing identification information "step" to execute image processing. Therefore, it is obvious that PUSH-type image processing can be executed during PULL-type image processing. More specifically, the data processing identification information "step" can be set so that the image processing circuits (1) 230 to (P) 270 are used mutually exclusive from one another in the PULL-type image processing based on the display list and the PUSH-type image processing by the image processing CPU 250.

According to the embodiment, the image processing output circuit outputs the calculation result to the memory shared with the image processing CPU, and the image processing CPU can use the calculation result to improve the processing capacity of the CPU. In this way, the image processing CPU can use part of the calculation resources of the image processing unit, and the processing capacity per operating frequency (consumed power) of the CPU can be improved.

Furthermore, the length direction of the band areas can be set in accordance with the sub-scanning direction of the image data. Therefore, the present invention can be implemented even if one pixel is set in the main-scanning direction and eight pixels are set in the sub-scanning direction in the 32-byte pixel data 520 in an image data format of FIG. 4.

According to the present invention, an image processing unit can flexibly read various data from an external memory for each band area to autonomously execute image processing while reducing the process load for controlling a CPU and a DMAC.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-135354, filed Jun. 4, 2009, which is hereby incorporated by reference herein in its entirety.

What is claimed is:

1. An image processing apparatus comprising:
   a memory configured to store a command list which includes a plurality of command information which specify one of a plurality of types of command;
   a processing unit configured to have a register set by a register control command and configured to execute a process based on a data processing command and the register; and
   an input unit configured to acquire the command list from the memory and to output the register control command to said processing unit when one of command information of the command list indicates the register control command, and to acquire image data from the memory and output a data processing command including the acquired image data to said processing unit when one of command information of the command list indicates a data acquisition command.

2. The apparatus according to claim 1, further comprising an output unit connected to said processing unit, said output unit configured to pack processed image data, which is obtained by said processing unit processing the data processing command, into a predetermined format and to execute direct memory access using an address instructed by the register control command outputted by said input unit to transfer the processed image data to the memory.

3. The apparatus according to claim 1, wherein
   said processing unit comprises a plurality of image processing circuits including different pieces of circuit identification information, the register control command outputted by said input unit includes circuit identification information for identifying the image processing circuit that needs to execute the command, and each of said plurality of processing circuits executes a register control command including circuit identification information coinciding with identification information of the processing circuit if the command is inputted, then outputs the command to a subsequent circuit, and outputs a register control command including circuit identification information not coinciding with the identification information of the processing circuit to a subsequent circuit without change if the command is inputted.

4. The apparatus according to claim 3, wherein
   the data processing command outputted by said input unit includes data processing identification information for identifying a process for data included in the command, and
   each of the plurality of image processing circuits uses the data included in the data processing command including the data processing identification information to execute the process corresponding to the data processing identification information if data processing identification information registered in the image processing circuit coincides with the data processing identification information included in the inputted data processing command.

5. The apparatus according to claim 1, wherein
   a buffer for temporarily storing data read by said input unit is constituted by a double-bank system, and reading from the memory and command generation from the buffer are executed in parallel.

6. An image processing apparatus comprising:
a command register for holding a plurality of command information set from the outside;
a buffer for holding data to be processed read from the outside;
a processing unit configured to have a register set by a register control command and configured to process image data based on a data processing command and a content stored in the register; and
an input unit configured to output the register control command for controlling the register of said processing unit based on one of the command information stored in said command register, and configured to output a data processing command for instructing data processing based on the one of the command information stored in said command register, wherein the data processing command is output with the data to be processed acquired from said buffer,
wherein the input unit includes a PUSH-type command generation unit which generates the data processing command based on the command information stored in command register and the data stored in the buffer.

7. The apparatus according to claim 6, wherein
said input unit further comprises a PULL-type command generation unit configured to acquire a command list from a memory, generate a command in accordance with the command list, and output the command to said processing unit,
said PULL-type command generation unit is configured to output the register control command for instructing writing or reading of data to and from the register to said processing unit if the register control command is acquired from the command list and
to use an address instructed by the register control command to acquire image data from the memory, generate the data processing command including the acquired image data, and output the data processing command to said processing unit if a data acquisition command for instructing data acquisition is acquired from the command list,
said processing unit comprises a plurality of image processing circuits, and
said PUSH-type command generation unit and said PULL-type generation unit are configured to generate a command to use the plurality of image processing circuits mutually exclusively from one another.

8. A control method of a processing apparatus that applies a process to data to be processed read from a memory, said processing apparatus comprising:
a memory configured to store a command list which includes a plurality of command information which specify one of a plurality of types of command; an input unit configured to output a command based on the command list; and
a processing unit configured to have a register and execute processing of image data based on the command outputted from said input unit and the register, said control method comprising:
a step by said input unit to acquire a command list from the memory;
a step by said input unit to output a register control command for instructing writing or reading of data to and from the register when one of the command information indicate the register control command; and a step by said input unit to use an address instructed by the register control command to acquire data to be processed from the memory when one of the command information indicates a data acquisition which includes the acquired data, and to output a data processing command including the acquired data to said processing unit.

9. A control method of a processing apparatus that applies a process to data to be processed, said processing apparatus comprising: an input unit comprising a command register for holding a command information set from the outside and a buffer for holding data to be processed set from the outside; and a processing unit configured to have a register and configured to process the data to be processed based on a content stored in the register and a command outputted from said input unit, said control method comprising:
a step of receiving writing of data for command generation to the buffer and writing of data to be processed to the buffer; and
a step by said input unit to generate a register control command for controlling a register of said processing unit and a data processing command for instructing data processing based on the command information stored in the command register and the data stored in the buffer and to output the data processing command to said processing unit with the data stored in the buffer.

* * * * *

UNITED STATES PATENT AND TRADEMARK OFFICE
CERTIFICATE OF CORRECTION

PATENT NO.         : 8,477,383 B2
APPLICATION NO.    : 12/771569
DATED              : July 2, 2013
INVENTOR(S)        : Tadayuki Ito Page 1 of 1

It is certified that error appears in the above-identified patent and that said Letters Patent is hereby corrected as shown below:

In the Claims

Column 20:

Claim 1, Line 10, "specify one of a plurality of types of command;" should read
-- specify at least one of a plurality of types of command; --.

Line 13, "process based on a data processing command and the" should read
-- process based on a data processing command and a content stored in the --.

Line 20, "and output a data processing command including the" should read
-- and output a data processing command with the --.

Column 22:

Claim 8, Line 6, "specify one of a plurality of types of command; an input" should read
-- specify at least one of a plurality of types of command; an input --.

Line 11, "from said input unit and the register, said control" should read
-- from said input unit and a content stored in the register, said control --.

Line 24, "data, and to output a data processing command including" should read
-- data, and to output a data processing command with --.

Signed and Sealed this
Twenty-second Day of October, 2013

Teresa Stanek Rea
*Deputy Director of the United States Patent and Trademark Office*